(12) United States Patent
Ito et al.

(10) Patent No.: US 8,220,410 B2
(45) Date of Patent: Jul. 17, 2012

(54) RESIN LAYER FORMATION METHOD, RESIN LAYER FORMATION DEVICE, DISK, AND DISK MANUFACTURING METHOD

(75) Inventors: Tomokazu Ito, Yokohama (JP); Hisashi Nishigaki, Yokohama (JP); Tsukasa Kawakami, Yokohama (JP); Haruka Narita, Yokohama (JP); Yoji Takizawa, Yokohama (JP); Takumi Hanada, Yokohama (JP); Munenori Iwami, Yokohama (JP)

(73) Assignee: Shibaura Mechatronics Corporation, Kanagawa (JP)

( * ) Notice: Subject to any disclaimer, the term of this patent is extended or adjusted under 35 U.S.C. 154(b) by 0 days.

(21) Appl. No.: 12/835,627

(22) Filed: Jul. 13, 2010

(65) Prior Publication Data

US 2010/0275840 A1    Nov. 4, 2010

Related U.S. Application Data

(62) Division of application No. 11/597,438, filed as application No. PCT/JP2005/010061 on Jun. 1, 2005, now Pat. No. 8,088,438.

(30) Foreign Application Priority Data

Jun. 3, 2004   (JP) ................................ 2004-165220

(51) Int. Cl.
*B05C 11/00*        (2006.01)
*B05C 11/02*        (2006.01)
(52) U.S. Cl. .......... 118/642; 118/665; 118/52; 118/612; 118/320

(58) Field of Classification Search ............... 118/52, 118/612, 56, 319, 320, 641–643, 663, 665; 427/240, 425, 407.1, 412.1, 558, 595
See application file for complete search history.

(56) References Cited

U.S. PATENT DOCUMENTS

| | | | |
|---|---|---|---|
| 5,743,965 A * | 4/1998 | Nishimura et al. ........... 118/712 |
| 6,284,044 B1 * | 9/2001 | Sakamoto et al. ............ 118/219 |
| 6,613,170 B1 | 9/2003 | Ohno et al. |
| 6,898,796 B2 | 5/2005 | Komaki et al. |
| 7,229,679 B2 | 6/2007 | Takazawa |
| 2003/0145941 A1 * | 8/2003 | Hanzawa .................... 156/275.7 |
| 2004/0028818 A1 * | 2/2004 | Alexandrovich Potyrailo et al. .......................... 427/372.2 |
| 2004/0161548 A1 * | 8/2004 | Nagashima et al. .......... 427/558 |
| 2005/0226131 A1 | 10/2005 | Ushida et al. |

FOREIGN PATENT DOCUMENTS

JP            5-337434       12/1993
(Continued)

*Primary Examiner* — Yewebdar Tadesse

(57) ABSTRACT

A resin layer formation method, resin layer formation device, disk and disk manufacturing method for making a resin layer uniform on a substrate before lamination or on a substrate to be coated by a simple procedure are provided. Adhesive A is coated at the inner circumference side while rotating a substrate P at low speed, a first adhesive layer AL1 is formed on the surface of the substrate P by rotating the substrate P at high speed, a step difference section H is formed around a rotation center of the substrate P by irradiating ultraviolet on an area in the inner circumference side of the first adhesive layer AL1 and hardening the area, the adhesive A is coated at the rotation center side from the step difference section H on the substrate P, and a second adhesive layer AL2 is formed on the first adhesive layer AL1 by rotating the substrate P at high speed. The first adhesive layer AL1 and the second adhesive layer AL2 are integrated to form a uniform adhesive layer B as a whole.

11 Claims, 29 Drawing Sheets

FOREIGN PATENT DOCUMENTS

| | | |
|---|---|---|
| JP | 2001-209980 | 8/2001 |
| JP | 2002-63737 | 2/2002 |
| JP | 2003-340359 | 12/2003 |
| JP | 2004-39050 | 2/2004 |
| JP | 2004-130298 | 4/2004 |
| JP | 2004-362693 | 12/2004 |
| WO | WO 98/49010 | 11/1998 |
| WO | WO 2004064055 A1 * | 7/2004 |

* cited by examiner

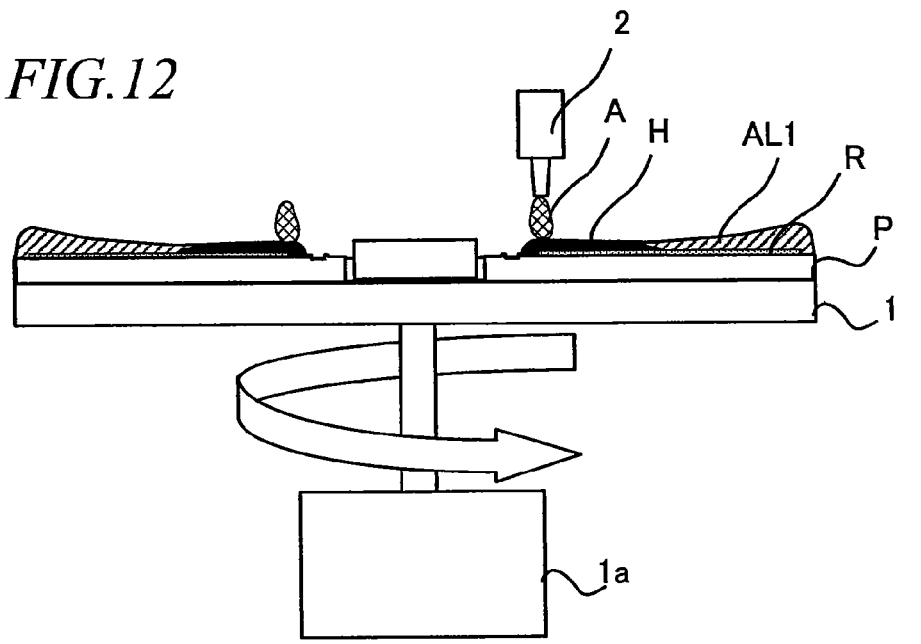
FIG.12
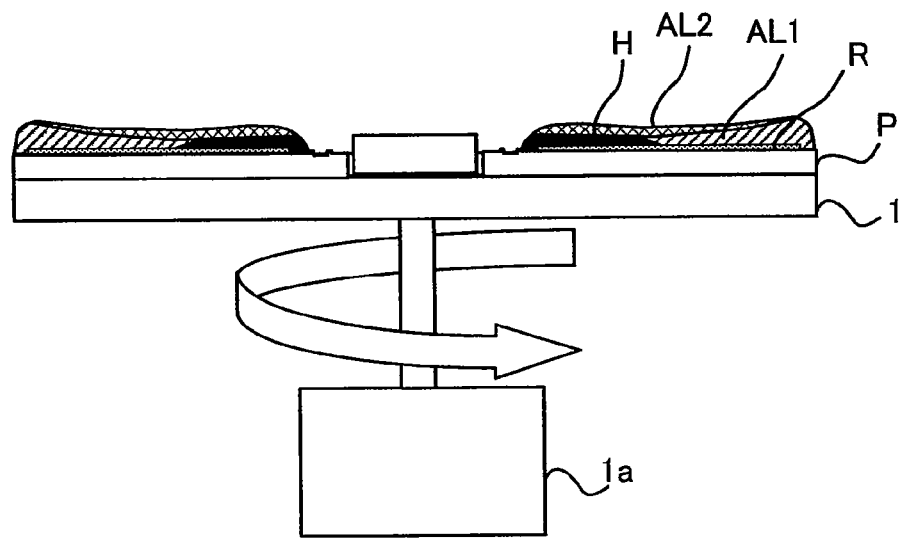

*FIG.13*
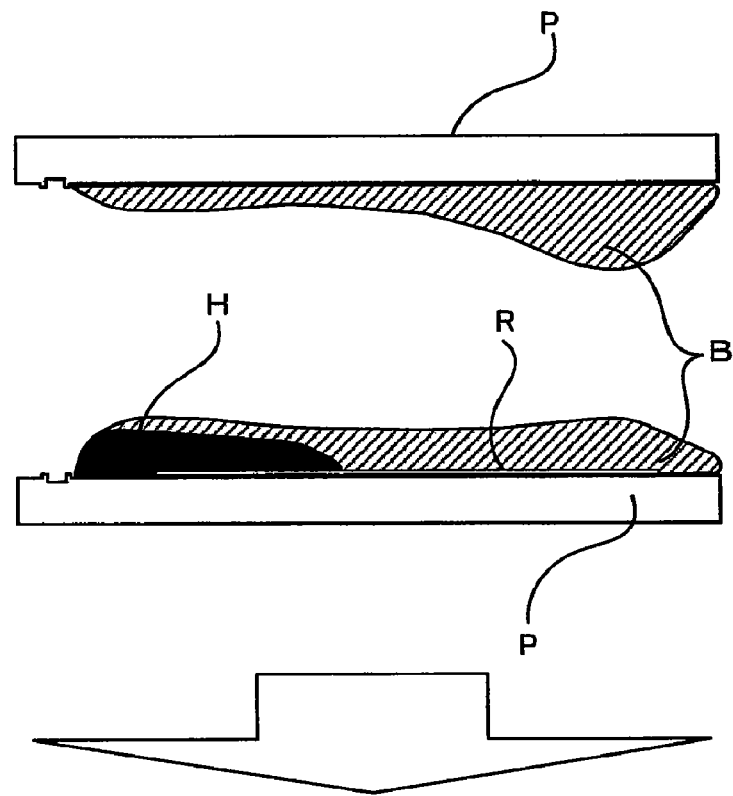
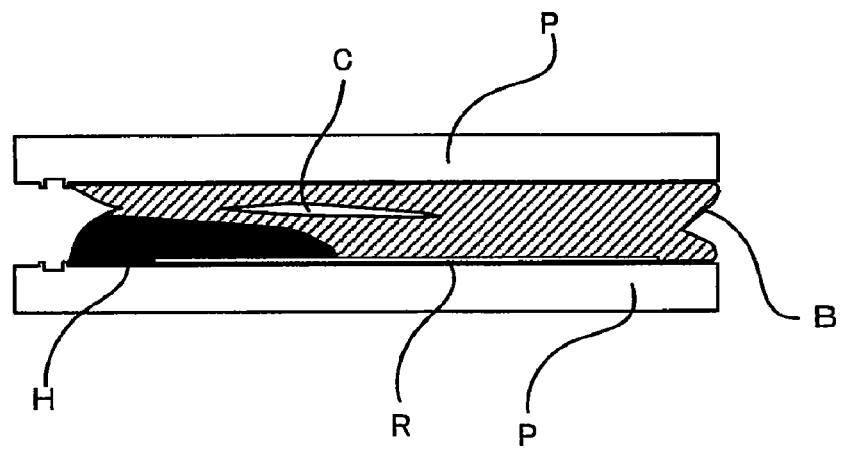

FIG.14
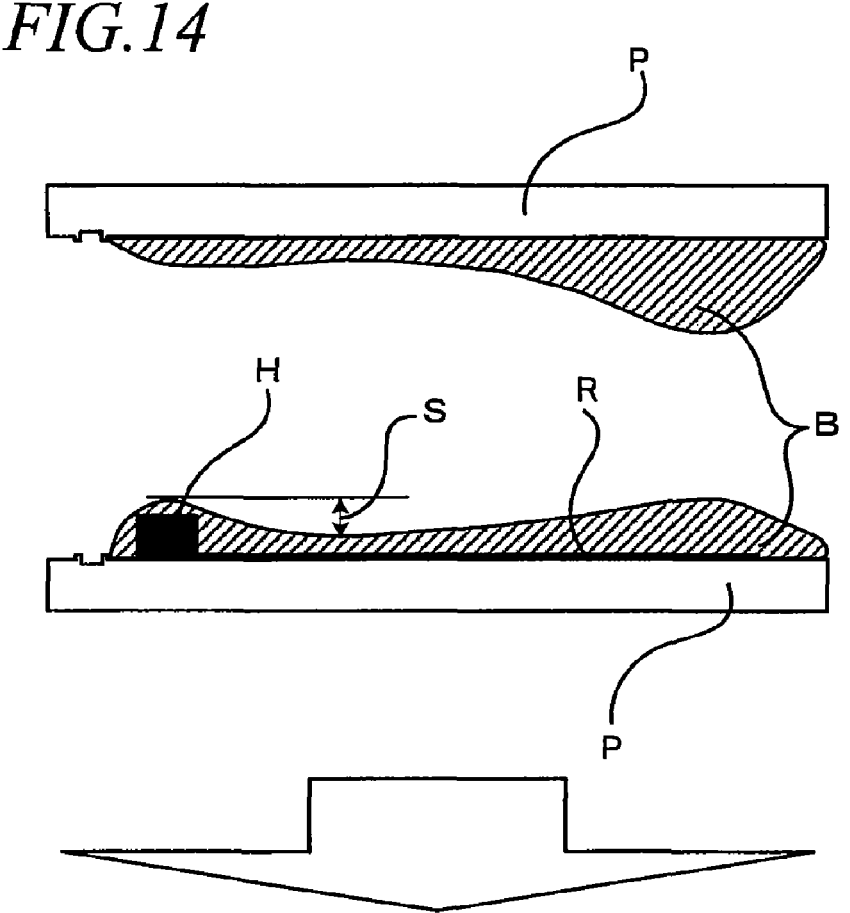
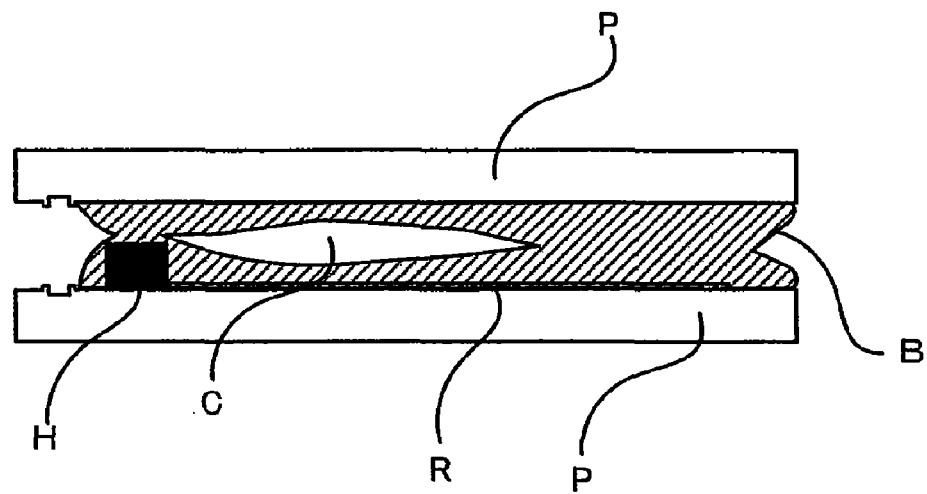

RESIN LAYER FORMATION METHOD, RESIN LAYER FORMATION DEVICE, DISK, AND DISK MANUFACTURING METHOD

RELATED APPLICATIONS

This is a divisional application of U.S. Ser. No. 11/597,438 filed on Nov. 29, 2007, now U.S. Pat. No. 8,088,438, which is a §371 application of PCT/JP2005/010061 filed on Jun. 1, 2005, which claims priority from Japanese Application No. 2004-165220 filed on Jun. 3, 2004.

TECHNICAL FIELD

The present invention relates to a method for forming a resin layer for adhering or coating a substrate when a flat recording medium such as an optical disk is manufactured, and more particularly to a resin layer formation method, resin layer formation device, disk, and disk manufacturing method in which accuracy of thickness of the resin layer is improved.

BACKGROUND ART

In optical reading type disk shape recording media, such as an optical disk and magneto-optical disk, various standards of products are on the market, including one that is read only and one on which recorded information can be overwritten. Such recording media are manufactured, in many cases, by laminating a pair of substrates with the adhesive layer in between, in order to protect the recording face formed on the substrate, or to implement high density recording by making the recording face multilayered.

Such a lamination type disk is manufactured, for example, as follows. Two polycarbonate substrates are injection-molded, and metal film (recording film) for reflecting a laser is formed by sputtering in a sputtering chamber. And an ultra violet-hardening type adhesive is coated on the bonding faces of the two substrates, and adhesive is spread by spin coating. Spin coating involves coating adhesive around the center of the substrate, and then forming a thin film of adhesive (adhesive layer) on the substrate by spinning the substrate at high speed.

The pair of substrates on which the adhesive layer is formed are inserted into a vacuum chamber, and the adhesive layers are laminated to each other in the vacuum. The substrates laminated to each other are removed from the vacuum chamber into the atmosphere, and ultraviolet is irradiated onto the entire substrates to harden the adhesive. By this the two substrates are firmly bonded, and the disk completes.

The substrates laminated together, as above, must be flat, without warp or distortion, so that a spot is stably formed when a laser to be used for reading and writing of information is irradiated onto the disk. Therefore in such an optical type disk, it is desirable that the film thickness of the adhesive layer of laminating is as uniform as possible. However, in the case of the above mentioned spin coating, where adhesive is spread by centrifugal force, the thickness at the outer circumference becomes thicker than that at the inner circumference (e.g. about 10 μm), and it is difficult to make film thickness uniform on the entire substrate.

To handle this problem, Japanese Patent Application Laid-Open No. 2001-209980 proposes a technology for making film thickness uniform on the entire substrate by laminating two substrates and hardening the adhesive of the inner circumference side first by irradiating ultraviolet on only the inner circumference side while rotating, then spreading the adhesive of the outer circumference side, and irradiating ultraviolet again on the entire surface for hardening the adhesive. Japanese Patent Application Laid-Open No. 2003-340359 proposes a technology for making film thickness uniform on the entire substrate by coating adhesive on the substrate, then irradiating ultraviolet on only the inner circumference side while rotating so as to partially increase viscosity, and spreading adhesive of the outer circumference side.

Also Japanese Patent Application Laid-Open No. 2002-63737 and No. 2004-39050 disclose prior arts, where a convex section is formed when adhesive is formed using centrifugal force, so that contact of the surfaces of the disks is prevented when completed disks are superimposed, although this is difference from a technology for making film thickness uniform.

However the technology disclosed in Japanese Patent Application Laid-Open No. 2001-209980 is for making the adhesive layer uniform by laminating the substrates first, then controlling irradiation of ultraviolet and the rotation of the substrate, so if the thickness of the adhesive on the substrate before lamination is not uniform, warp or distortion is generated in the substrate during lamination, and correction in later processing becomes difficult. Although the inner circumference side is hardened first by irradiating ultraviolet, it takes time to set the optimum values of the irradiation range, irradiation time and rotation frequency so that no difference is generated between the inner circumference portion which has already been hardened and of which thickness has been determined, and the unhardened portion. Actually, as Embodiment 2 of Japanese Patent Application Laid-Open No. 2001-209980 shows, optimum values must be adjusted while measuring the film thickness for each lot using a film thickness measuring device, which is an involved procedure.

Japanese Patent Application Laid-Open No. 2003-340359 is not for coating adhesive for laminating together substrates but for forming the coating layer on the surface of the substrates, so hardening is progressed by irradiating ultraviolet onto the inner circumference side, and therefore this cannot be applied to a technology for laminating together substrates. Also just like Japanese Patent Application Laid-Open No. 2001-209980, it takes time to set such optimum values as irradiation range, irradiation time and rotation frequency. In Japanese Patent Application Laid-Open No. 2002-63737 and No. 2004-39050, a convex portion remains on the surface of the disk, which is incompatible with uniform coating.

DISCLOSURE OF THE INVENTION

With the foregoing in view, the present invention proposes to solve the problems of prior art, and an object thereof is to provide a resin formation method, resin formation device, disk, and disk manufacturing method for making the resin layer uniform on a substrate before lamination or on a substrate before coating using a simple procedure.

To achieve the above object, the present invention is a resin layer formation method for forming a resin layer on a surface of substrate, comprising the steps of: forming an adjustment section for adjusting spread of resin by hardening a part of the resin spread on the surface of the substrate; coating resin inside from the adjustment section or on the adjustment section on the substrate; and rotating the substrate.

According to the above invention, the spread of resin from the inner circumference side to the outer circumference side is adjusted by the adjustment section when the resin spreads by centrifugal force during rotation of the substrate, so it can be prevented that the film thickness at the outer circumference side becomes excessively thick, and a uniform resin layer can be formed.

In a preferred mode, the adjustment section is a step difference section or hardened section formed on the surface of the substrate.

According to this mode, when the resin spreads by centrifugal force during rotation of the substrate, the excessive flow of resin from the inner circumference side to the outer circumference side is suppressed by the step difference section or the hardened section formed in advance, so a uniform resin layer as a whole can be formed with a simple procedure.

In a preferred mode, a resin layer formation method for forming a resin layer on a surface of a substrate, comprises steps of: coating resin on the surface of the substrate; forming a first resin layer on the surface of the substrate by rotating the substrate; forming a hardened section around a rotation center of the substrate by hardening a part of the first resin layer; coating resin at the rotation center side from the hardened section of the substrate or on the hardened section; and forming a second resin layer on the first resin layer by rotating the substrate.

According to this mode, highly accurate uniformity can be implemented by a simple procedure of forming the hardened section after forming the first resin layer, then forming the second resin layer.

In a preferred mode, the resin is ultraviolet-hardened resin, and the hardened section is formed by irradiating ultraviolet on a part of the substrate.

According to this mode, the hardened section can be formed using a material, the same as the resin, used for laminating and coating, so a uniform resin layer can be formed without using special material.

In a preferred mode, a plurality of hardened sections are formed by irradiating ultraviolet on a plurality of areas of the substrate using a movable ultraviolet irradiation section.

According to this mode, the spread of the resin to the outer circumference is suppressed by the plurality of hardened sections, so a uniform resin layer as a whole can be formed.

In a preferred mode, a plurality of hardened sections are formed by irradiating ultraviolet using a plurality of ultraviolet irradiation sections.

According to this mode, a plurality of ultraviolet irradiation sections are used to form a plurality of hardened sections, so time for forming the hardened sections can be decreased.

In a preferred mode, the hardened section is formed by irradiating ultraviolet on the substrate using an ultraviolet irradiation section of which irradiation range is variable.

In a preferred mode, the ultraviolet irradiation section is constructed so that the irradiation range is variable.

According to these modes, the irradiation range can be changed according to various conditions so as to form a uniform resin layer.

In a preferred mode, a resin layer formation method for forming a resin layer on a surface of a substrate comprises steps of: coating resin on the surface of the substrate; forming a first resin layer on the surface of the substrate by rotating the substrate; forming a hardened section around a rotation center of the substrate by hardening a part or all of the first resin layer; coating resin at the rotation center side from the hardened section of the substrate or on the hardened section; forming a second resin layer on the first resin layer by rotating the substrate; forming a first hardened layer by hardening all of the first resin layer and second resin layer; coating resin at the rotation center side from the first hardened layer of the substrate or on the first hardened layer; forming a third resin layer by rotating the substrate; forming a second hardened layer by hardening all of the third resin layer; and repeating the steps of forming the third resin layer and the second hardened layer a plurality of times.

According to this mode, a film with a desired thickness can be formed uniformly by repeating formation and hardening of the resin layer a plurality of times.

In a preferred mode, the resin is heated when the second resin layer is formed.

In a preferred mode, the resin is heated when the third resin layer is formed.

In a preferred mode, a resin layer formation device comprises: a coating section for coating ultraviolet-hardening type resin on a surface of a substrate; a rotation section for forming a first resin layer on the surface of the substrate by rotating the substrate; an ultraviolet irradiation section for forming a hardened section by hardening a part of resin by irradiating ultraviolet around a rotation center of the substrate; and a heating section for heating resin coated inside from the hardened section or on the hardened section by the coating section while rotating the substrate by the rotation section.

According to this mode, viscosity drops by heating when the resin layer is formed, so flowability increases, and film thickness decreases and becomes uniform as a whole.

In a preferred mode, the resin is heated using a heating section of which heating range is variable.

In a preferred mode, the heating section is constructed so that the heating range is variable.

According to these modes, the heating range can be changed so that a uniform resin layer is formed according to various conditions.

In a preferred mode, the resin layer is formed on one or both surfaces of a pair of substrates by the above mentioned resin layer formation method, and the pair of substrates are laminated together via the resin layer.

In a preferred mode, a disk in which a pair of substrates are laminated together via a resin layer characterized in that an adjustment section for adjusting the spread of resin is created around a center of the laminating surface of at least one of the pair of substrates by hardening a pair of spread resin and the resin layer is spread from an area inside from the adjacent section or on the adjustment section to the edge of the substrate, is provided.

According to these modes, the spread of the resin layer to be an adhesive layer is adjusted and becomes uniform, so a disk of which intermediate layer is uniform and with very little warp can be manufactured.

In a preferred mode, a resin layer formation device comprises: a first rotation section for rotating a substrate on which ultraviolet-hardening type resin is coated, so as to form a first resin layer on the surface of the substrate; an ultraviolet irradiation section for irradiating ultraviolet on a part of the first resin layer so as to form a hardened section by hardening an area around a rotation center of the substrate; and a second rotation section for rotating the substrate on which ultraviolet-hardening type resin is coated inside from the hardened section or on the hardened section, so as to form a second resin layer on the first resin layer.

According to this mode, the first resin layer on one substrate and second resin layer on the other substrate can be simultaneously formed by the first and second rotation sections, so the products can be mass produced efficiently.

As described above, according to the present invention, the resin layer formation method, resin layer formation device, disk, and disk manufacturing method for making the resin layer uniform on a substrate before lamination or on a substrate to be coated can be provided using a simple procedure.

BRIEF DESCRIPTION OF THE DRAWINGS

FIG. 12 is a diagram depicting the spread coating step of the second adhesive layer according to the embodiment in FIG. 11;

FIG. 13 is a diagram depicting the laminating step of the substrates according to the embodiment in FIG. 11;

FIG. 14 is a diagram depicting the laminating step of the substrates when the adhesive layer is thick;

BEST MODE FOR CARRYING OUT THE INVENTION

Embodiments of the present invention will now be described with reference to the drawings.

[First Embodiment]

[Configuration of Device]

First the configuration of a resin layer formation device used for the first embodiment, (hereafter called "this device"), will be described with reference to FIG. 1. This device constitutes a part of a disk manufacturing device, and for a substrate molding device and metal film formation device which are installed in the upstream steps of this device, a laminating device of substrates and hardening device by ultraviolet radiation, which are installed in the upstream steps of this device, and a mechanism for transferring substrates between each device, various known technologies can be applied, for which description is omitted.

Figure 1:
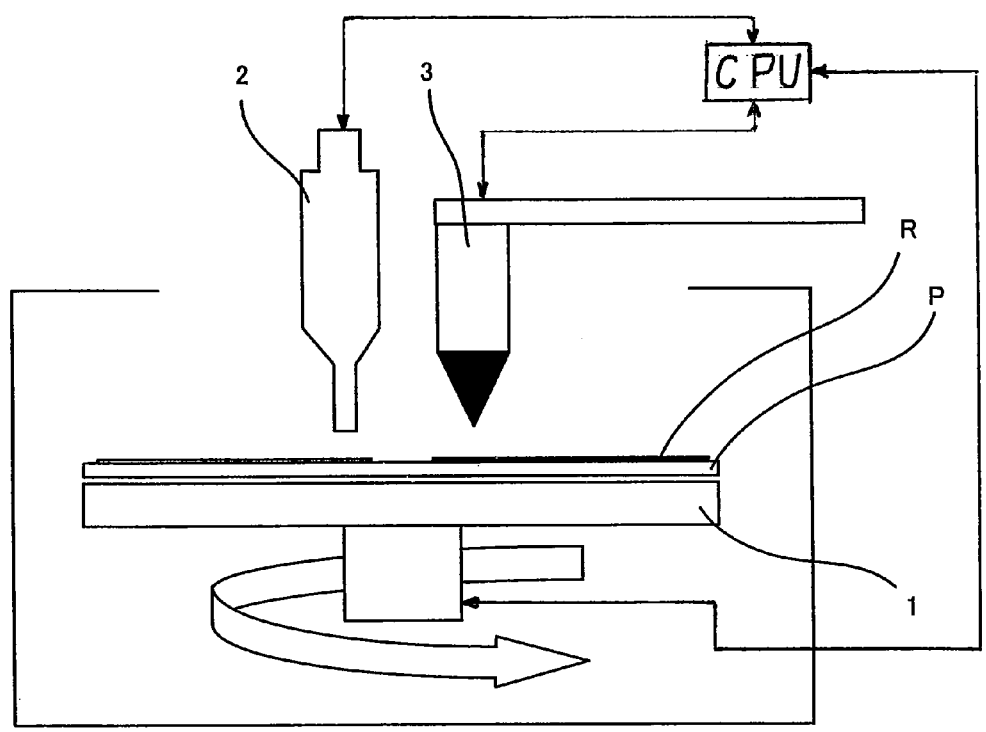
FIG. 1 is a diagram depicting a general configuration of an example of the device for implementing the first embodiment of the present invention.

In other words, as shown in FIG. 1, this device has a turntable 1 on which a substrate P for a disk is mounted, an adhesive coating section 2 for coating adhesive on the substrate P, and an ultraviolet irradiation section 3 for irradiating ultraviolet onto the adhesive. The turntable 1 is a device on which a disk type substrate P is placed and set, one at a time, and which rotates. The adhesive coating section 2 is a nozzle for coating ultraviolet-hardening type adhesive supplied from an adhesive tank, which is not illustrated, on the inner circumference side of the substrate P. This adhesive coating section 2 can scan the substrate P in the diameter direction so as to coat the adhesive on a desired position on the substrate P. The ultraviolet irradiation section 3 is a light source for hardening a part of the adhesive in a circle by spot-irradiating ultraviolet around the inner circumference of the adhesive spread on the substrate P. The ultraviolet irradiation section 3 can also scan the substrate P in the diameter direction so as to irradiate ultraviolet on a desired position on the substrate P.

The operation timing of the drive mechanism of the rotation and velocity adjustment of the turntable 1, dripping of adhesive and movement of the adhesive coating section 2, and light emission and movement of the ultraviolet irradiation section 3 are controlled by a control device. This control device is implemented by a computer, CPU, shown in FIG. 1 which operates by a dedicated electronic circuit or a predetermined program, for example. Therefore the computer program for controlling the operation of this device according to the procedure to be described herein below and a recording medium recording this program are also aspects of the present invention.

[Formation of Adhesive Layer]

Figure 2:
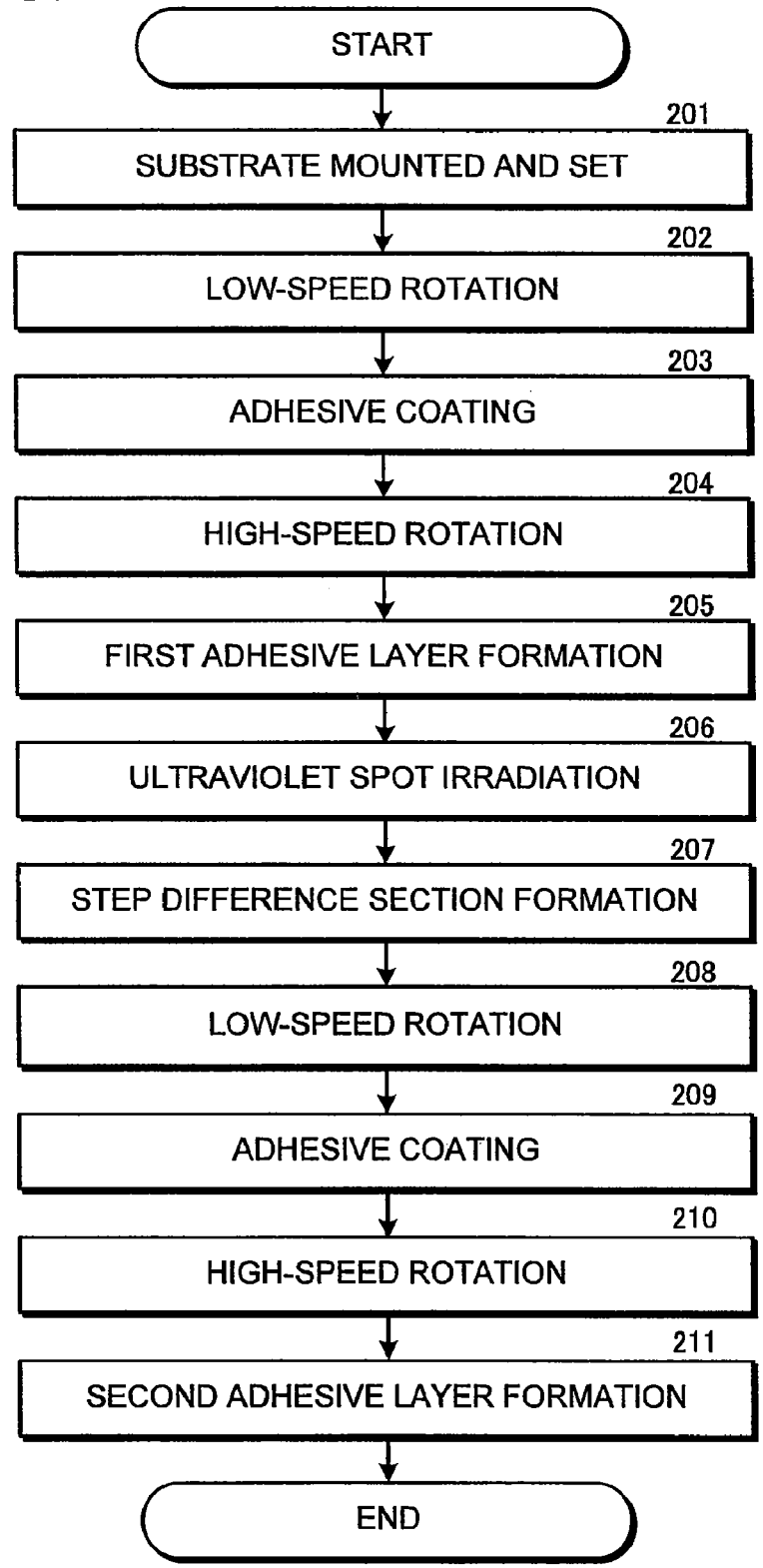
FIG. 2 is a flow chart depicting the adhesive layer formation step according to the embodiment in FIG. 1.
Figure 3:
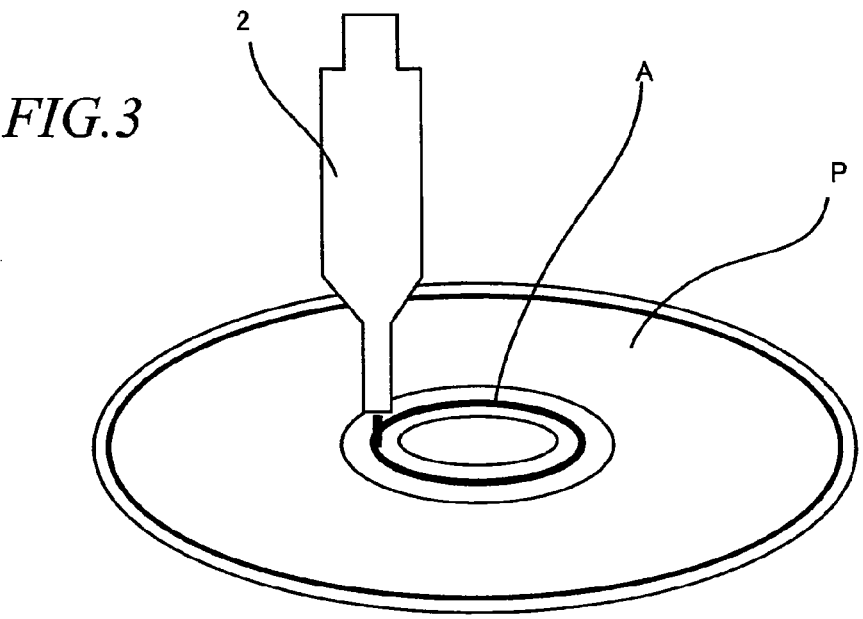
FIG. 3 is a diagram depicting the first adhesive coating step according to the embodiment in FIG. 1.

A method for forming the adhesive layer on the substrate P by this device mentioned above will be described with reference to the flow chart in FIG. 2, and the diagrams in FIG. 1 and FIG. 3 to FIG. 9. As FIG. 1 shows, the substrate P, on which a recording film R is formed in the previous step, is mounted on the turntable 1 with the recording film R side up (step 201). And the substrate P is rotated at low-speed by activating the turntable 1 (step 202). The velocity of the low-speed rotation is 20 to 400 rpm, for example, but is not limited to this value. As FIG. 3 shows, the adhesive A is dripped from the adhesive coating section 2 at the inner circumference side from the recording film R on the substrate P, which is rotating at low speed in this way (step 203). By this, the adhesive A is coated around the center of the substrate P in a circle.

Figure 4:
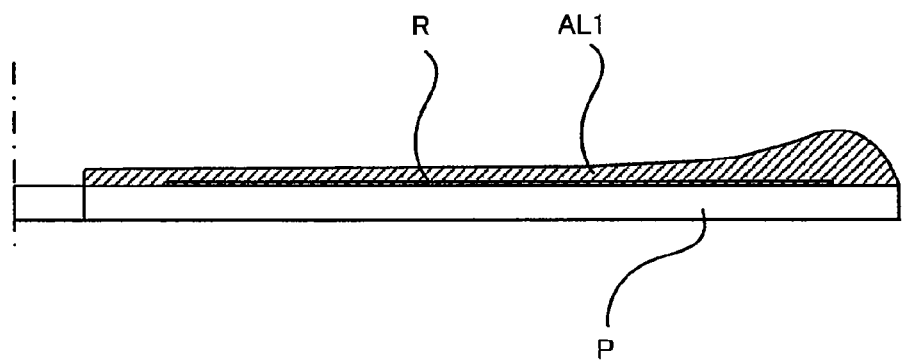
FIG. 4 is a longitudinal cross-sectional view depicting the first adhesive layer on the substrate according to the embodiment in FIG. 1.

After coating the adhesive A like this, the substrate P is rotated at high speed by the turntable 1 (step 204). The velocity of the high-speed rotation is 300 to 10000 rpm, for example, but is not limited to this value. When the adhesive A is spread and spun away to the outer circumference direction by this high-speed rotation, the first adhesive layer AL1, covering the recording film R, is formed as shown in FIG. 4 (step 205). At this time, just like the above mentioned prior art, the cross-section of the first adhesive layer AU has a form which gradually rises from the inner circumference to the outer circumference.

Figure 5:
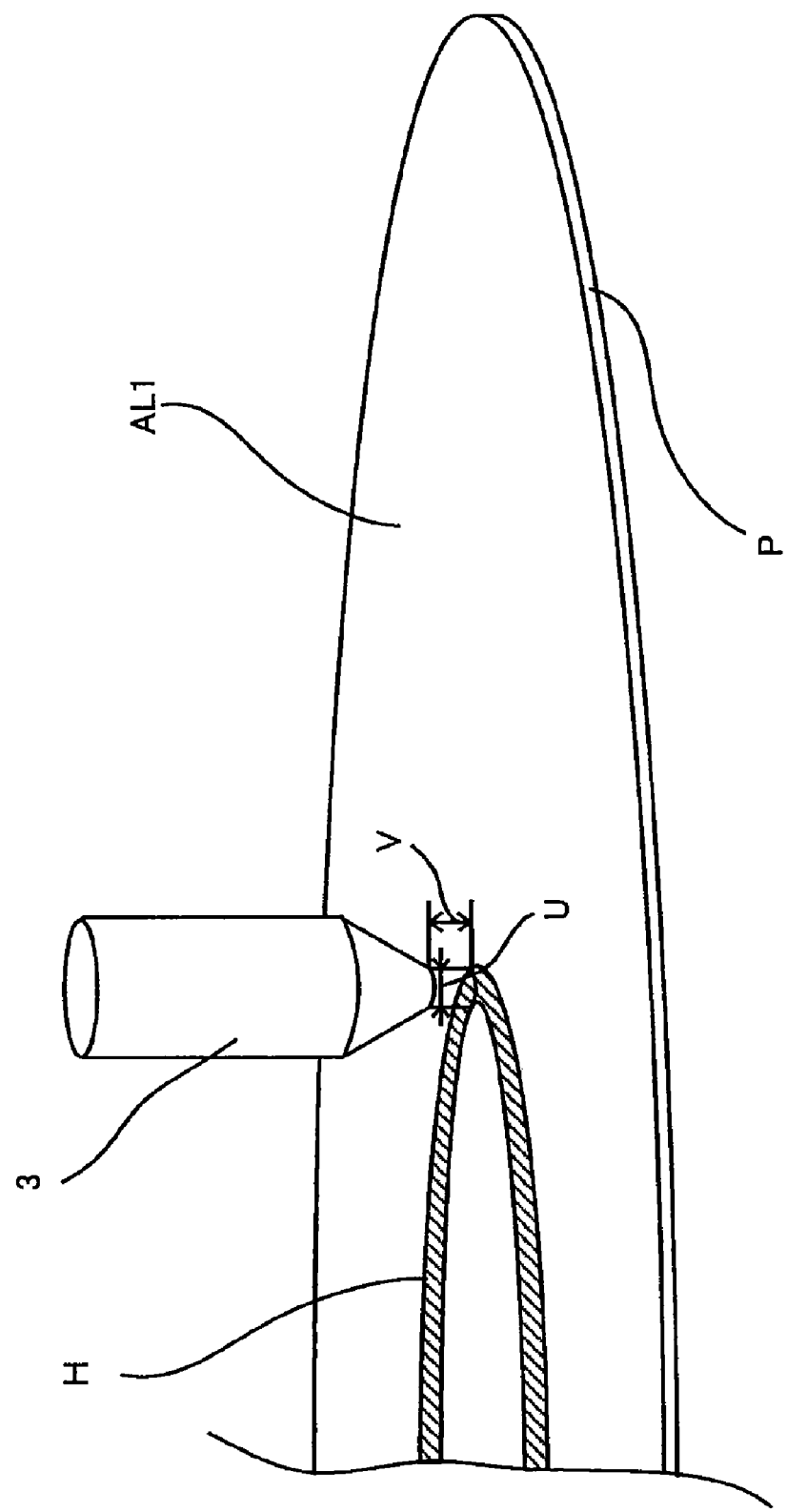
FIG. 5 is a diagram depicting the step difference section formation step by the ultraviolet irradiation section according to the embodiment in FIG. 1.
Figure 6:
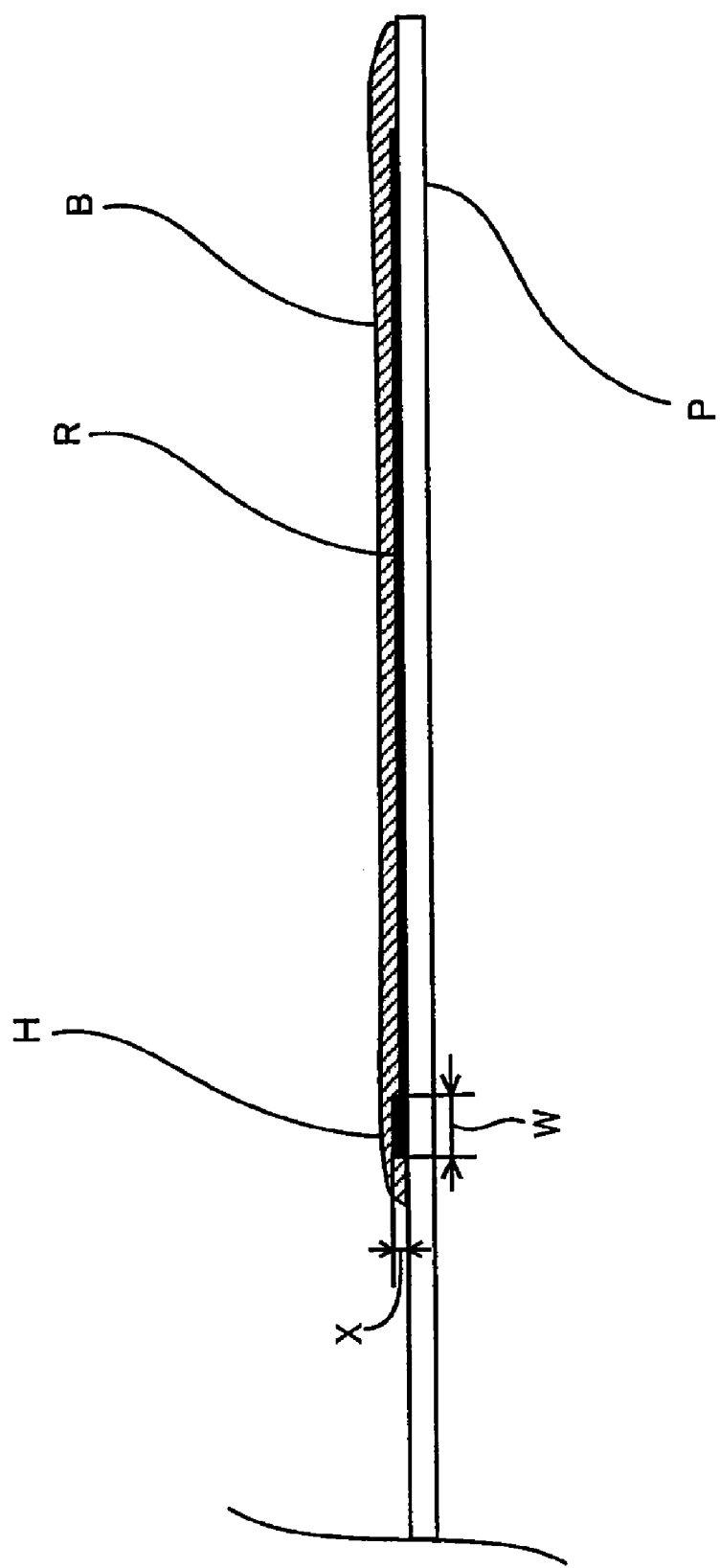
FIG. 6 is a longitudinal cross-sectional view depicting the step difference section on the substrate according to the embodiment in FIG. 1.
Figure 7:
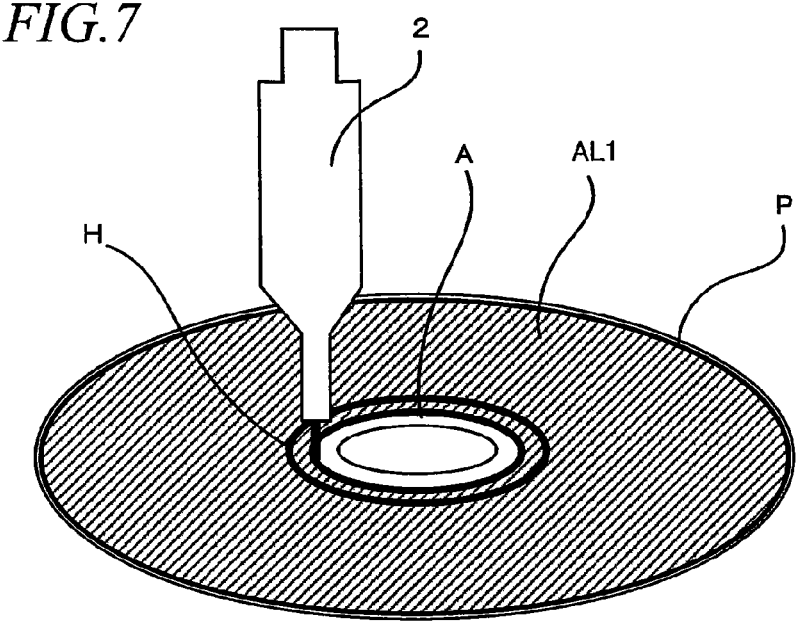
FIG. 7 is a diagram depicting the second adhesive coating step according to the embodiment in FIG. 1.

Then as FIG. 5 shows, ultraviolet is spot-irradiated at the inner circumference side of the first adhesive layer AL1 (e.g. inside from the recording film R) on the rotating substrate P by the ultraviolet irradiation section 3 (step 206). Then, as FIG. 6 shows, only the circular portion irradiated by ultraviolet is selectively hardened, and a step difference section H, where the hardened portion is raised from the surface of the substrate P, is formed (step 207). The irradiation time at this time can be freely changed according to the thickness of the first adhesive layer AL1 only if it is time sufficient for hardening, and is, for example, time required for turning the substrate P once or several times. Then the substrate P is rotated at low-speed by the turntable 1 (step 208). And as FIG. 7 shows, the adhesive is dripped on the inside from the step difference section H by the adhesive coating section 2, the adhesive A is coated in a circle on the first adhesive layer AL1 at the inner circumference of the step difference section H of the substrate P or on the inner circumference of the first adhesive layer AL1 (step 209).

Figure 8:
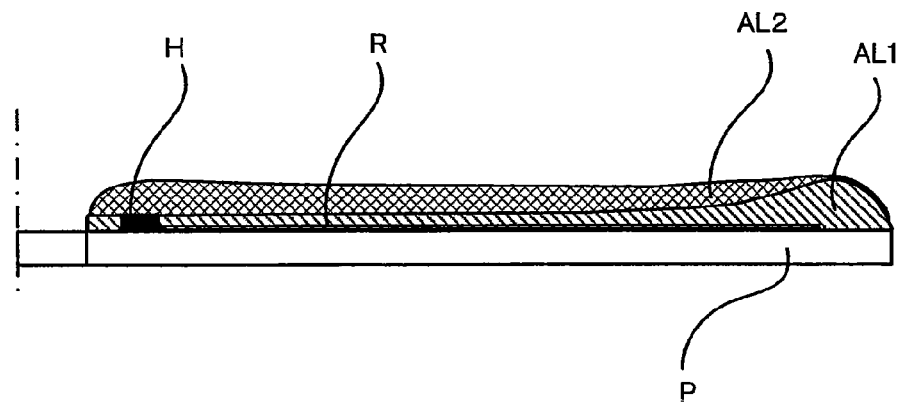
FIG. 8 is a longitudinal cross-sectional view depicting the first and second adhesive layers on the substrate according to the embodiment in FIG. 1.

After coating this adhesive A, the substrate P is rotated at high speed by the turntable 1. When the adhesive A is spread and spun away to the outer circumference direction by this high-speed rotation, the second adhesive layer AL2 is formed on the first adhesive layer AL1 (step 210), as shown in FIG. 8. At this time, the first adhesive layer AL1, which is not yet hardened, and the second adhesive layer AL2 are integrated, and an adhesive layer B, of which film thickness is uniform from the inner circumference to the outer circumference, is formed (step 211).

Figure 9:
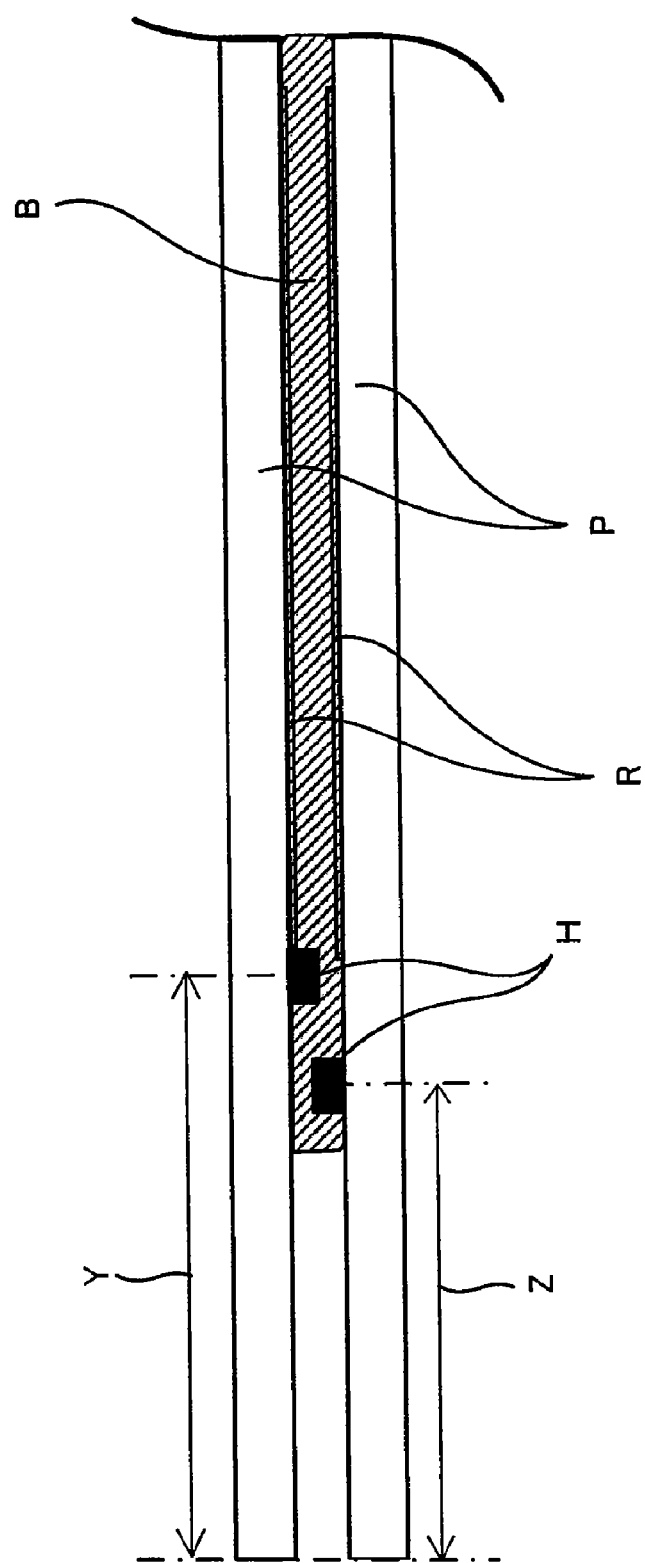
FIG. 9 is a diagram depicting the positional relationship of the step difference section after lamination according to the embodiment in FIG. 1.

By the above steps, the pair of substrates P on which the adhesive layer B is formed respectively are laminated together with the adhesive layer B there between by the laminating device, as shown in FIG. 9, and the adhesive layer B is hardened by the hardening device irradiating the ultraviolet on the entire surface. By this, a disk, which has two layers of recording films R inside, is formed it is preferable to adjust the position of the ultraviolet irradiation section 3 so that the step difference sections H of the pair of substrates P do not face each other at laminating. For the pair of substrates P to be laminated together, the adhesive layer B may be formed on both or may be formed on only one of them.

EXAMPLE

The experiment result according to an embodiment of the present invention will be described with reference to FIG. 5, FIG. 6, FIG. 9 and FIG. 10. The present experiment is on a laminated substrate for a DVD having at least two layers of recording films, that is, a semitransparent layer and a reflection layer, where the substrate on which the semitransparent layer is formed and substrate on which the total reflection layer is formed are laminated together, and the thickness of the adhesive layer was measured.

First the first adhesive layer AL1 is spread on the substrate P on which the recording film R has been formed, then the step difference section H is formed by ultraviolet irradiation, as shown in FIG. 5. The conditions of ultraviolet irradiation for forming the step difference section H are as follows. The rotation frequency of the substrate P during irradiation is 60 rpm, and the illuminance around the irradiation hole of the ultraviolet irradiation section 3 is about 1000 mW/cm$^2$, the wavelength to be irradiated is 365 mm, and irradiation time is (for one turn). The spot diameter U of the ultraviolet irradiation section 3 is about 5 mm, and the irradiation height V is about 5 mm. By this ultraviolet irradiation, the step difference section H, of which step difference width W is about 5 mm and step difference height X is about 10 μm, is formed, as shown in FIG. 6. And the adhesive layer B is formed by spreading the second adhesive layer AL2, as mentioned above.

Under the same conditions, a substrate P, where the step difference section H is formed at a position of which distance from the center is different, and the adhesive layer B is formed, is created, and both substrates P are laminated together so that the adhesive layers B are joined to each other, as shown in FIG. 9. In FIG. 9, the recording film R at the top is the semitransparent layer, and the recording film R at the bottom is the total reflection layer, and the step difference section H at the top is at distance Y from the center, which is 31 mm, and the step difference section H at the bottom is at distance Z from the center, which is 22 mm.

Figure 10:
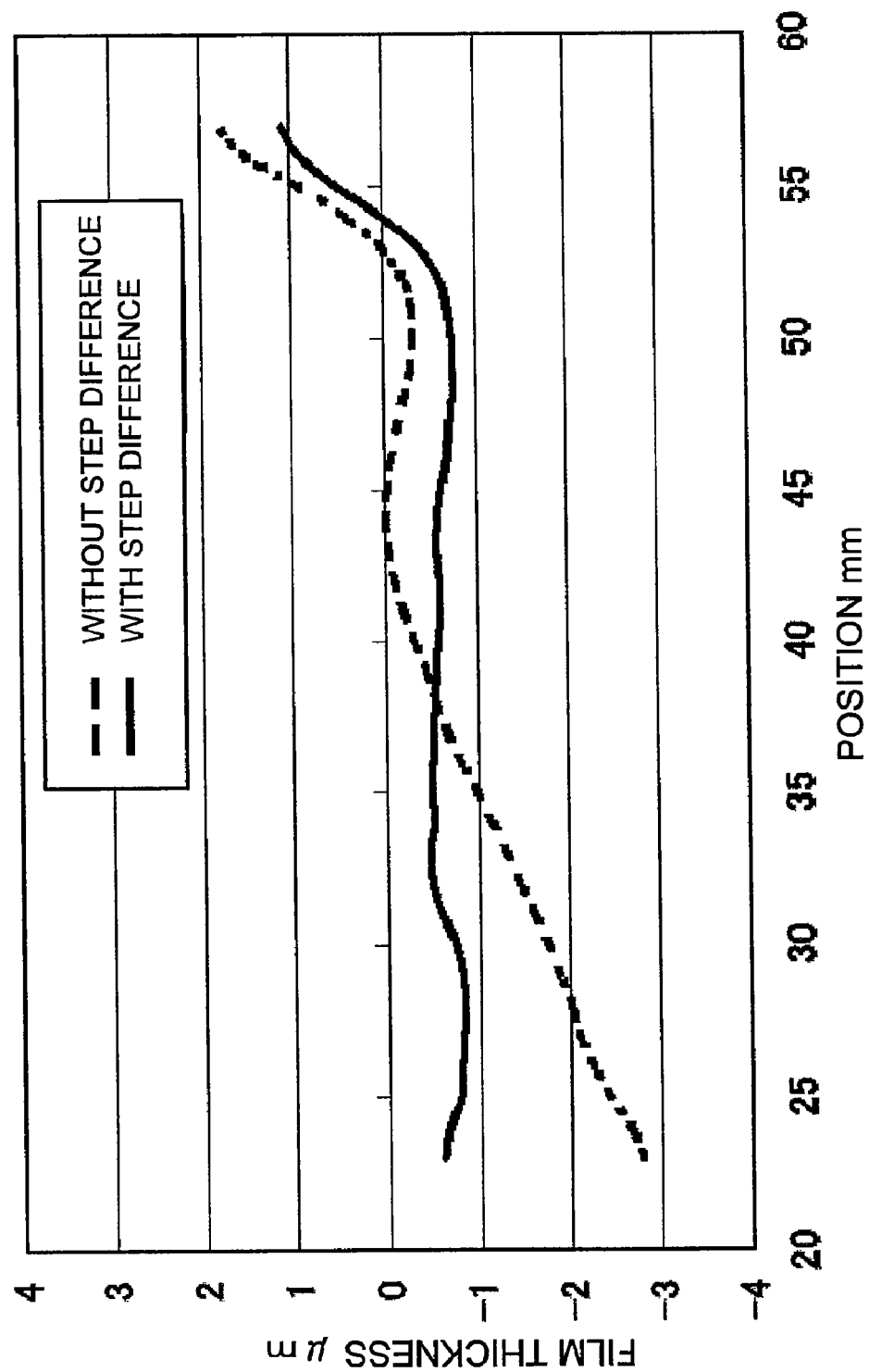
FIG. 10 is a graph depicting the experiment result when uniformity of the adhesive layers is measured for the present invention and prior art.

FIG. 10 shows the result when the thickness of the adhesive layer was measured in the disk after this laminating and hardening. The comparison example is a disk when the adhesive layer is formed only by a conventional spread by high-speed spinning, without forming the step difference section, and the substrates are laminated together. The abscissa in FIG. 10 indicates the distance from the center of the disk, and the ordinate indicates the thickness of the adhesive layer when 20μ is regarded as "0". According to this result, when the step difference section is formed, the range of film thickness in the area at 24 mm to 55 mm from the disk center, including the recording face, is about 19 to 21 μm, and the difference thereof is about 2μm (±1). Whereas in the case of a convention method without the step difference section, the range of the film thickness in an area at 24 mm to 55 mm from the disk center, including the recording face, is about 17 to 21 µm, and the difference thereof is about 4 (−3 to +1) µm, which is wide.

[Effect]

According to the present embodiment, the hardened step difference section H is formed at the inner circumference section of the first adhesive layer AL1, and then the second adhesive layer AL2 is formed, so the excessive flow of adhesive from the inner circumference side to the outer circumference side by centrifugal force during high-speed rotation of the substrate P is suppressed. Therefore the adhesive layer B can be uniformly spread on the substrate P before lamination together using a simple procedure, and after the substrates P are laminated together, the thickness of the disk can be made uniform without any special steps, so products without warp and distortion can be mass produced in a short time.

Particularly for ultraviolet irradiation, only spot-irradiation for forming the step difference section H and general irradiation after lamination are required, so it is unnecessary to harden the area from the inner circumference side to the outer circumference side in steps by irradiating ultraviolet on the substrates P after lamination together or to change viscosity, and products with a predetermined quality can be mass produced efficiently. Also if the spot diameter of the ultraviolet irradiation section 3 and the irradiation time are changed, the height, width, position, count and degree of hardness of the step difference section H change, so the thickness of the adhesive layer B can be adjusted by this, and the quality of the disk for each production lot can be easily changed and corrected.

[Second Embodiment]

[Configuration of Device]

Figure 11:
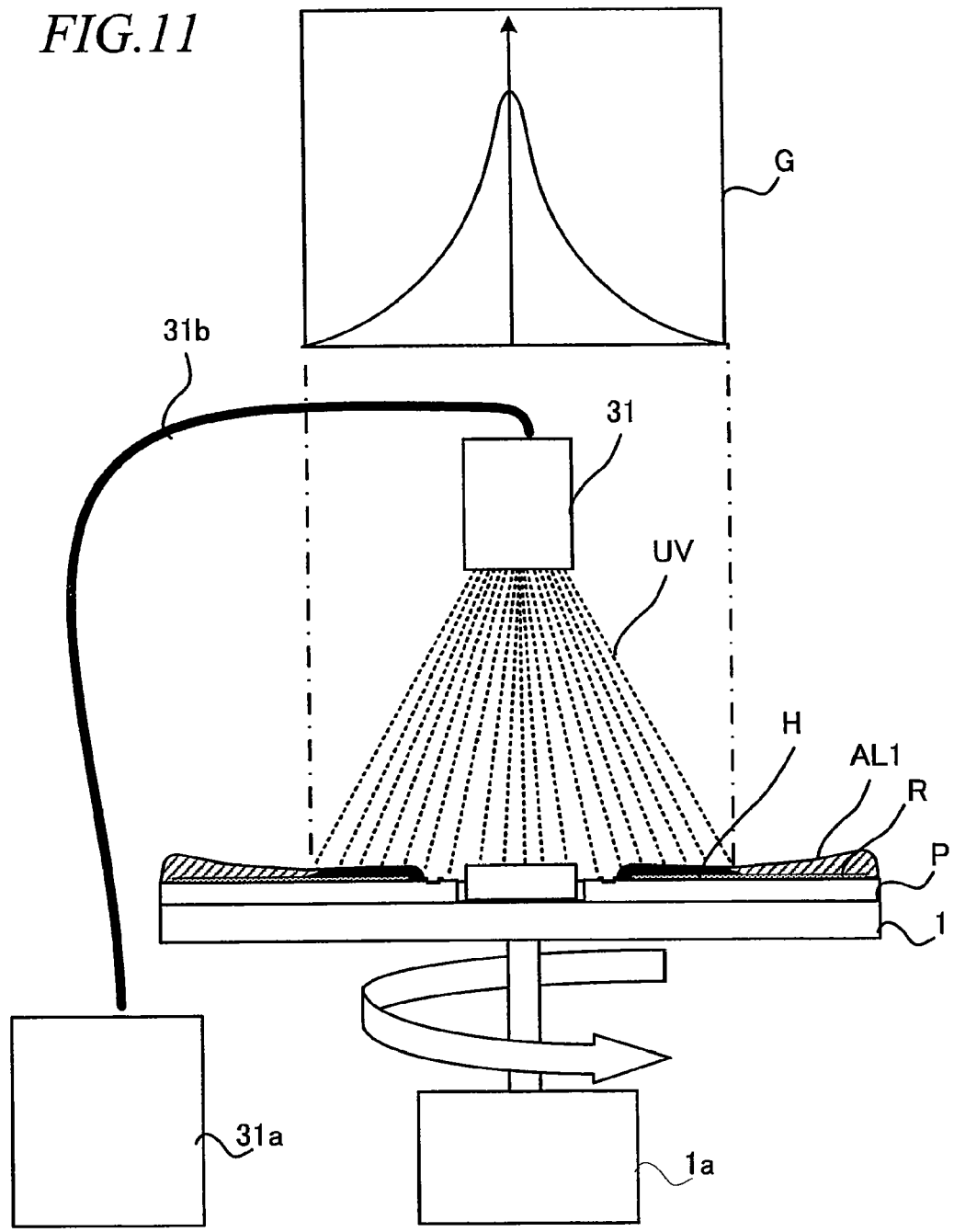
FIG. 11 is a diagram depicting a general configuration of an example of the device for implementing the second embodiment of the present invention.

The configuration of the resin layer formation device used for the second embodiment (hereafter called "this device") will be described with reference to FIG. 11. This device basically has the same configuration as the above mentioned first embodiment, but the ultraviolet irradiation section 31 is placed at a height where it does not interrupt moving the substrate P (e.g. 50 to 200 mm), so that the ultraviolet UV guided from a light source 31a via an optical fiber 31b can be irradiated in a relatively wide range. Because of this, the ultraviolet UV spreads, and the irradiation range becomes about 0 to 35 mm from the center of the substrate P in the diameter direction. The irradiation range should preferably be within 50 mm in the diameter direction, but is not strictly limited to this value, or may be variable, instead of being fixed. The graph G shown at the top in FIG. 11 is an intensity distribution of the ultraviolet UV, where the abscissa indicates the irradiation position in the horizontal direction, and the ordinate indicates the ultraviolet intensity. 1a is a drive section for rotating the turntable 1.

[Formation of Adhesive Layer]

A method for forming the adhesive layer on the substrate P by this device mentioned above will be described with reference to FIG. 11 to FIG. 13. Description of the procedure, which is the same as the above mentioned first embodiment, will be simplified. As FIG. 11 shows, the substrate P, on which a recording film R is formed in the previous step, is placed on the turntable 1, and the first adhesive layer AL1 is formed. Then by the ultraviolet irradiation section 31, the ultraviolet UV is irradiated in a relatively wide range from the inner circumference side of the first adhesive layer AL1.

Then only the portion irradiated by the ultraviolet UV is selectively hardened, and this hardened portion, raised from the surface of the substrate P, which is the step difference section H, is formed in a relatively wide range. The irradiation intensity on the substrate P is strong at the center of the irradiated light, and decreases as the outer circumference is approached. In the area where the intensity is strong, the adhesive is completely hardened, but as the outer circumference is approached, the adhesive A is influence more by oxygen interference, and the surface of adhesive A is not hardened and the inside thereof is hardened. Therefore hardening inside the adhesive decreases gradually as the outer circumference is approached, so the step difference section H is formed with a gentle slope.

And as FIG. 12 shows, by rotating the turntable 1 at low-speed while dripping the adhesive A onto the stop difference section H by the adhesive coating section 2, the adhesive A is coated on the first adhesive layer AL1 in a circle at the inner circumference of the step difference section H of the substrate P. After coating the adhesive A like this, the substrate P is rotated at high speed by the turntable 1. When the adhesive A is spread and spun out to the outer circumference direction by this high-speed rotation, the second adhesive layer AL2 is formed on the first adhesive layer AL1.

At this time, as FIG. 13 shows, the unhardened first adhesive layer AL1 and the second adhesive layer AL2 are integrated, and the adhesive layer B is formed with uniform film thickness from the inner circumference to the outer circumference. The film thickness becomes uniform like this because when the adhesive A is spread, the surface on the step difference section H drops flowability. In other words, in the portion of the step difference section H where the adhesive A is hardened, flowability drops because hardening on the surface is uneven, which contributes to forming a uniform film thickness. Also when the adhesive A is reacting and hardening, the hardening reaction reaches the adhesive A attached to this surface, which causes a drop in flowability. And the slope of the step difference section H is mild, so the difference of the thickness of the adhesive layer B, depending on the position on the substrate P, is decreased. Assuring the thickness of the step difference section H has the effect of raising the thin area at the inner circumference, and all of these factors work together to implement uniformity.

A pair of substrates P, on which the adhesive layer B is formed respectively by the above mentioned steps, are laminated together in a vacuum with the adhesive layers B there between by a laminating device, as shown in FIG. 13. Since the difference in the thickness of the adhesive layer B is small, space C, generated at laminating, becomes very thin, and when the substrates P are returned to the atmosphere, space C is compressed by the flow of the adhesive layer B, and bubbles are removed.

[Effect]

According to the present embodiment, effects similar to the first embodiment are implemented, and residual bubbles can be suppressed and yield can be improved even if the adhesive layer B becomes thick. For example, when the slope of the step difference section H is sharp and the adhesive layer B becomes thick, as shown in FIG. 14, the difference S of the thickness of the adhesive layer B increases, and space C, which is generated at laminating, increases, so it takes time to compress and remove bubbles, but in the present embodiment, this time can be decreased.

Also the step difference section H can be formed without rotating the substrate P, so the procedure is simple. And a mechanism and operation for approaching the ultraviolet to the substrate P for spot-irradiation are unnecessary. So the device is simplified and the cost can be decreased.

[Third Embodiment]

[Configuration of Device]

Figure 15:
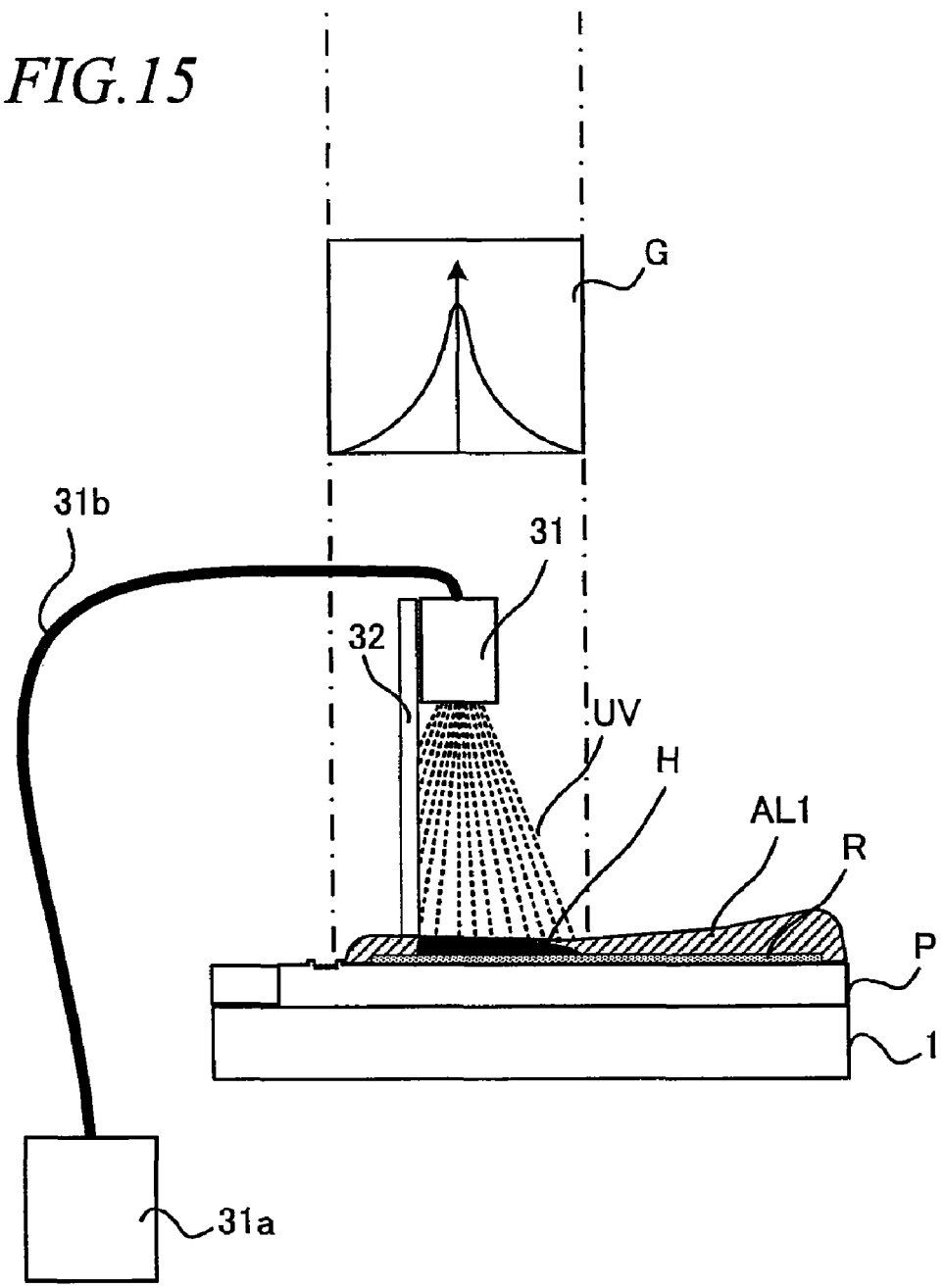
FIG. 15 is a diagram depicting a general configuration of an example of the device for implementing the third embodiment of the present invention.

The configuration of the resin layer formation device used for the third embodiment (hereafter called "this device") will be described with reference to FIG. 15. This device basically has the same configuration as the above mentioned second embodiment, but a light shielding plate 32 is installed near the ultraviolet irradiation section 31. This light shielding plate 32 is for shielding the irradiation of the ultraviolet UV into an area within 15 mm from the center on the substrate P in the diameter direction, and by this, the irradiation range is set to be 15 to 50 mm from the center in the diameter direction. (The present invention is not strictly limited to this range.) The graph shown at the top in FIG. 15 is an intensity distribution of the ultraviolet UV, just like FIG. 11.

[Formation of Adhesive Layer]

A method for forming the adhesive layer on the substrate P by this device mentioned above will be described with reference to FIG. 15 and FIG. 16. Description of the procedure which is the same as the above mentioned second embodiment will be omitted. As FIG. 15 shows, when ultraviolet UV is irradiated onto the first adhesive layer AL1 by the ultraviolet irradiation section 31, the irradiation into the area within 15 mm from the center in the diameter direction is shielded by the light shielding plate 32, so the step difference section H where only the portion within 15 to 50 mm from the center is selectively hardened is formed. The outer circumference side of the step difference section H is formed with a mild slope, just like the second embodiment.

Figure 16:
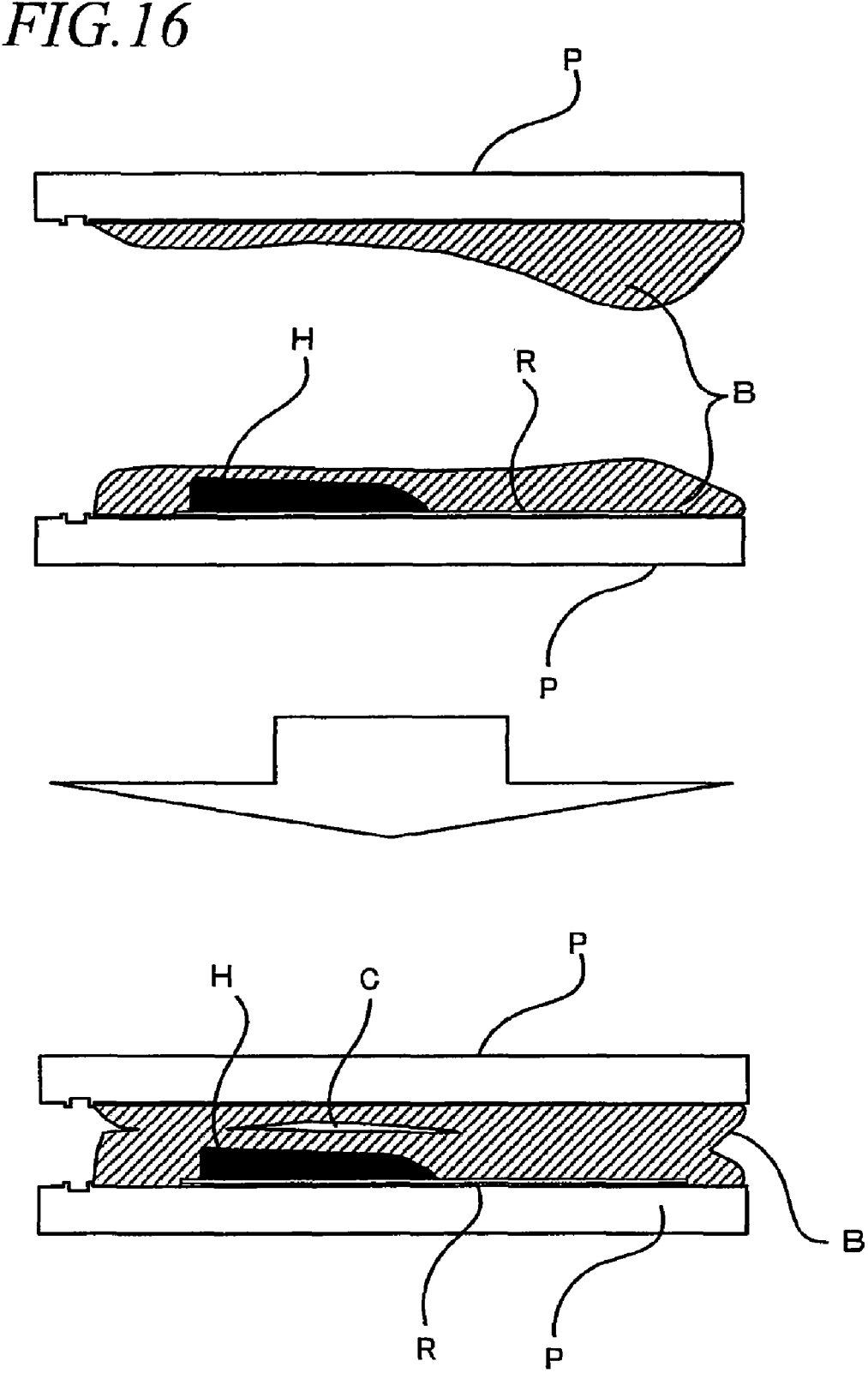
FIG. 16 is a diagram depicting the laminating step of the substrates according to the embodiment in FIG. 15.

And when the adhesive A is dripped and coated in a circle on an area inside from the step difference section H by the adhesive coating section 2, and then the adhesive is spread and spun out to the outer circumference direction by high-speed rotation, the second adhesive layer is formed on the first adhesive layer AL1, as shown in FIG. 16, and these layers are integrated, and the adhesive layer B with uniform film thickness is formed from the inner circumference to the outer circumference. The factors to make the film thickness uniform like this are the same as the factors of the first embodiment and second embodiment.

A pair of substrates P on which the adhesive layer B is formed respectively by the above mentioned steps are laminated together in a vacuum with the adhesive layers B there between by the laminating device, as shown in FIG. 16. Since the difference in thickness of the adhesive layer B is smaller, space C generated at laminating becomes very thin, and when the substrates P are returned to the atmosphere, space C is compressed by the flow of the adhesive layer B, and bubbles are removed.

[Effect]

According to the present embodiment, effects similar to the second embodiment are implemented, and by coating the adhesive on an area inside from the step difference section H, the flow of the adhesive into the outer circumference is further suppressed, so uniform film thickness can be easily implemented.

[Fourth Embodiment]
[Configuration of Device]

Figure 17:
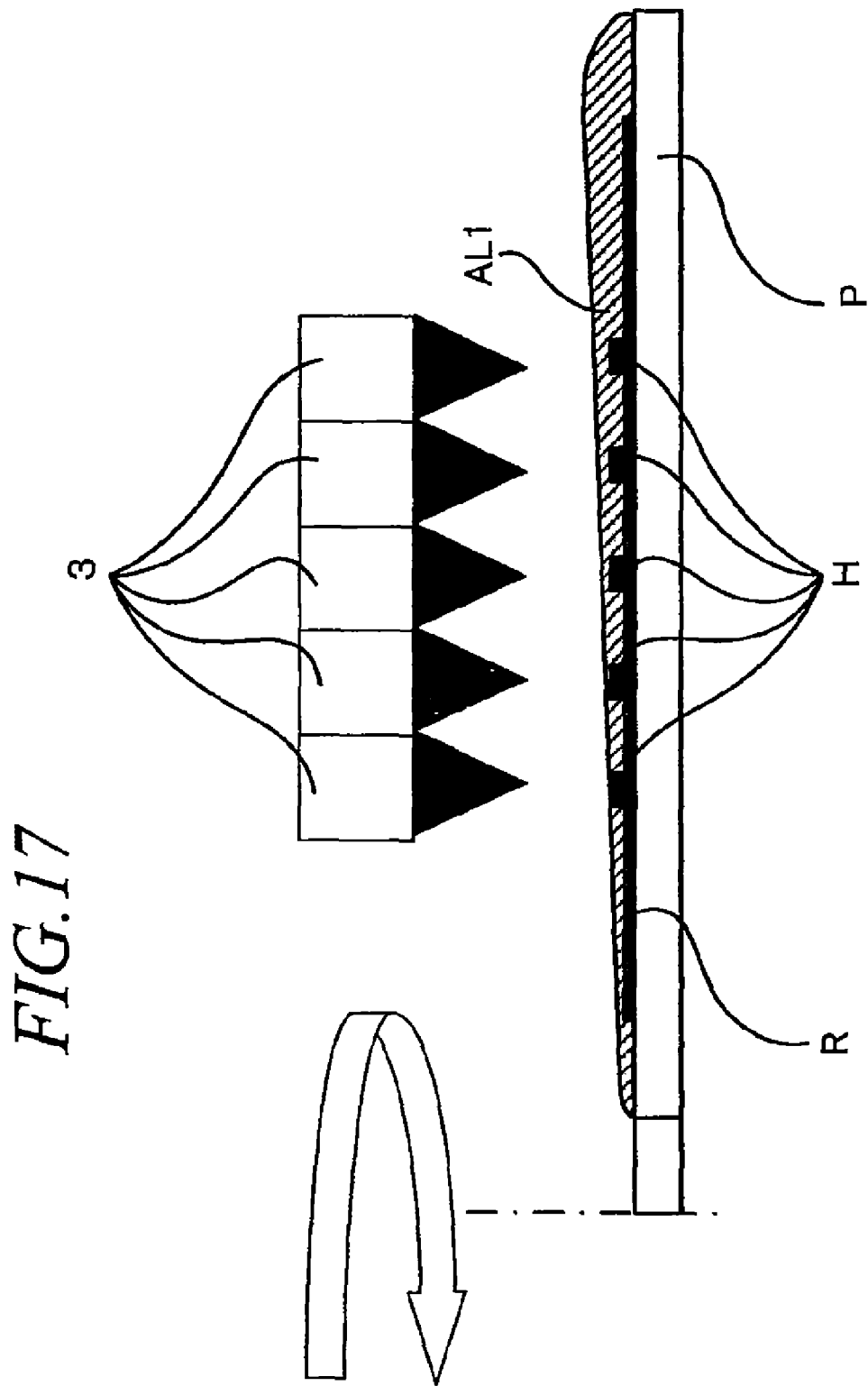
FIG. 17 is a diagram depicting the step difference section formation step according to the fourth embodiment of the present invention.
Figure 19:
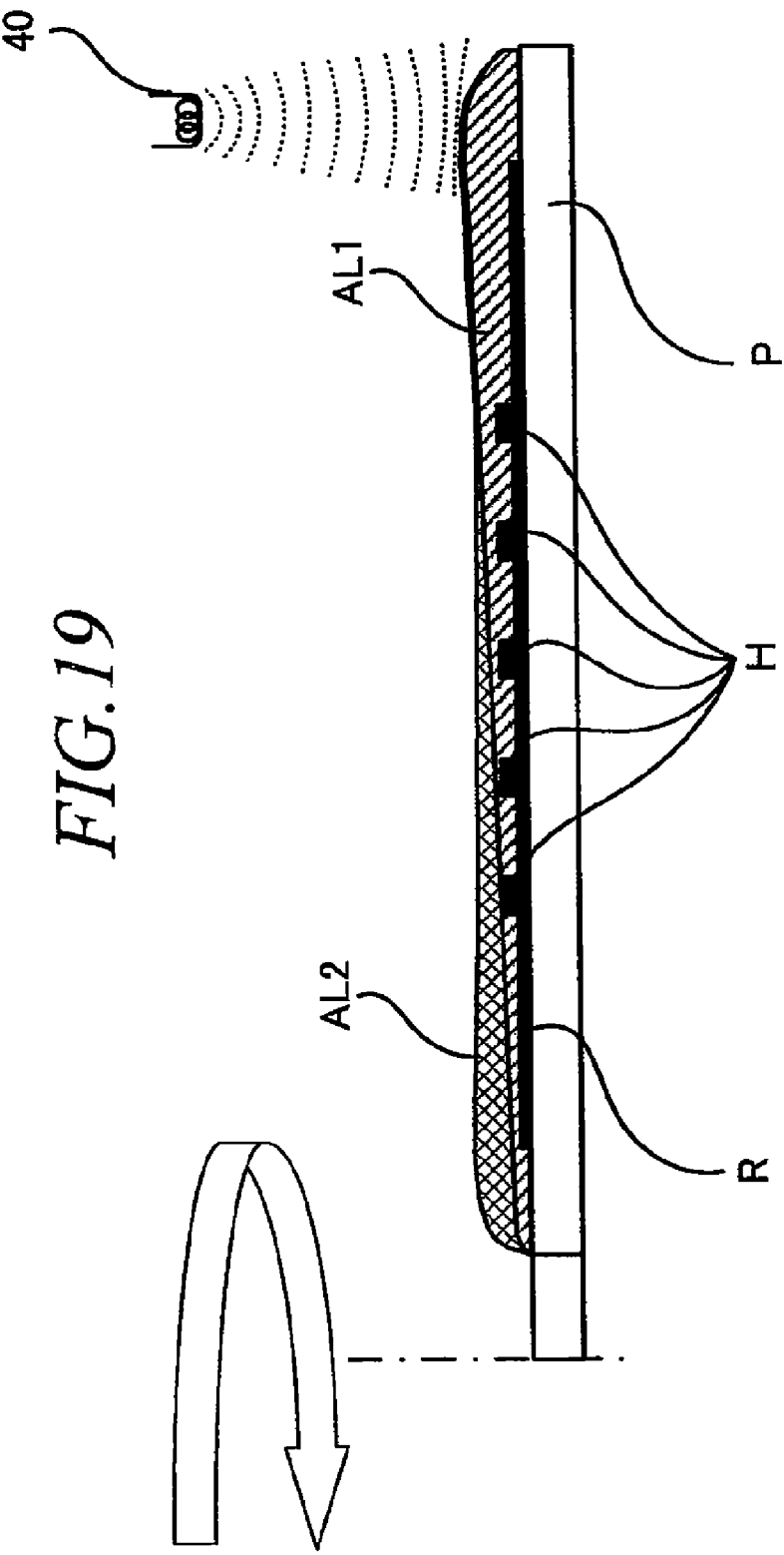
FIG. 19 is a diagram depicting the spread step of the second adhesive layer according to the embodiment in FIG. 17.

The configuration of the resin layer formation device used for the fourth embodiment (hereafter called "this device") will be described with reference to FIG. 17 and FIG. 19. This device basically has the same configuration as the above mentioned first embodiment, but many ultraviolet irradiation sections 3 are installed in the diameter direction of the substrate P in advance, as shown in FIG. 17. Also at the outer circumference side of the substrate P, a heating section 40, such as a heater or an infrared irradiation device, is installed, as shown in FIG. 19.

[Formation of Adhesive Layer]

A method of forming the adhesive layer on the substrate P by this device mentioned above will be described with reference to FIG. 17 to FIG. 20. Description of the procedure which is the same as the above mentioned first embodiment will be simplified. As FIG. 17 shows, the substrate P on which recording film R is formed in a previous step is placed on the turntable, and the first adhesive layer AL1 is formed. Then by simultaneously irradiating the ultraviolet from the plurality of ultraviolet irradiation section 3 while rotating the substrate P, a plurality of circular step difference sections H are formed concentrically.

Figure 18:
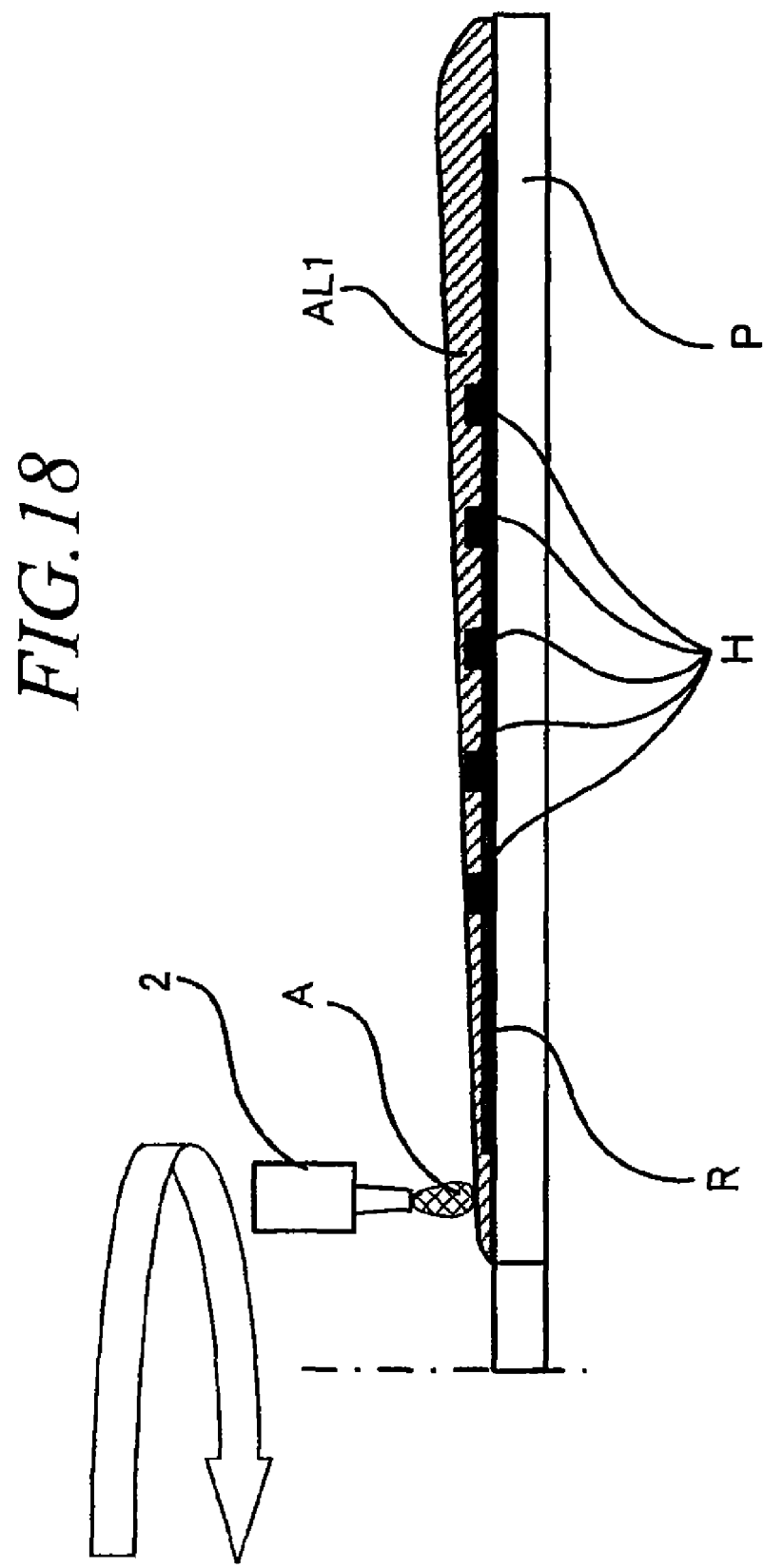
FIG. 18 is a diagram depicting the coating step of the second adhesive layer according to the embodiment in FIG. 17.

And by dripping the adhesive A on the step difference sections H by the adhesive coating section 2, as shown in FIG. 18, the adhesive A is coated in a circle on the first adhesive layer AL1 in the inner circumference of the step difference section H of the substrate P. After coating this adhesive A, the substrate P is rotated at high speed by the turntable 1. At this time, the outer circumference section of the substrate P is heated by the heating section 40 as shown in FIG. 19. And the adhesive A is spread and spun out to the outer circumference section by the high-speed rotation, and the second adhesive layer AL2 is formed on the first adhesive layer AL1. At the same time, the outer circumference section is heated and viscosity of the adhesive A drops, so flowability increases and film thickness decreases.

Figure 20:
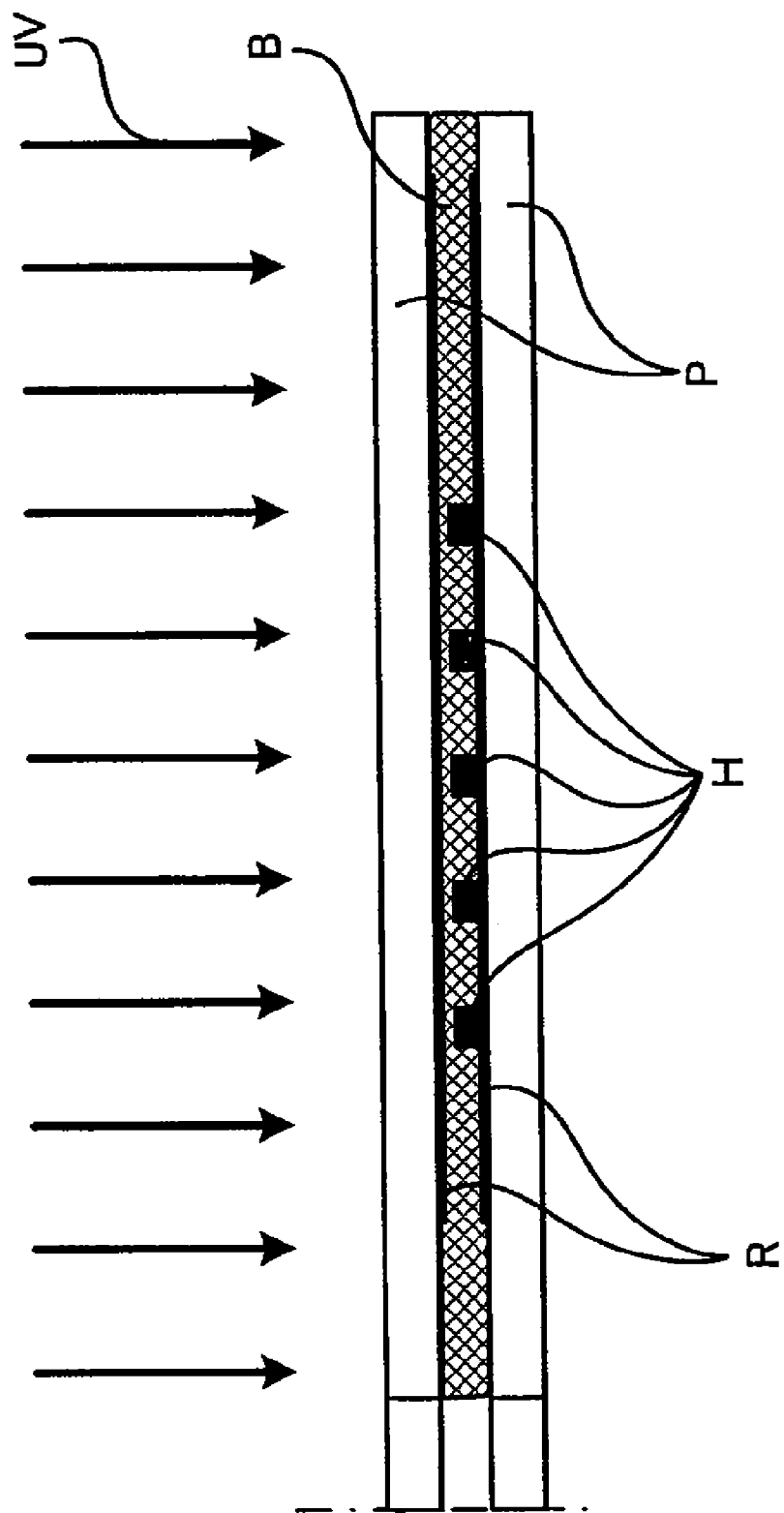
FIG. 20 is a diagram depicting the ultraviolet irradiation step after lamination according to the embodiment in FIG. 17.

By this, as FIG. 20 shows, the unhardened first adhesive layer AU and second adhesive layer AL2 are integrated, and the adhesive layer B, of which film thickness is uniform from the inner circumference to the outer circumference, is formed, and a pair of substrates P, on which the adhesive layer B is formed respectively, are laminated together in a vacuum with the adhesive layer B there between by the laminating device. And the adhesive layer B is hardened by irradiation of the ultraviolet UV on the entire surface.

[Effect]

According to the present embodiment, effects similar to the first embodiment are implemented, and by forming a plurality of step difference sections H, the flow of the adhesive A to the outer circumference side can be further suppressed. Also by heating the outer circumference side, the film thickness of the outer circumference side can be decreased, so uniformity can be easily implemented.

[Fifth Embodiment]

Figure 21:
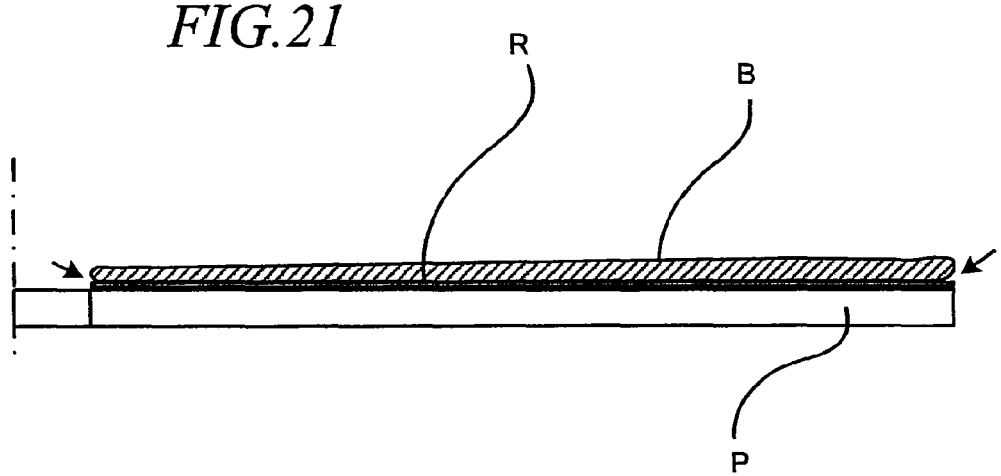
FIG. 21 is a diagram depicting the shrinkage of adhesive at the inner and outer circumferences according to prior art.

The fifth embodiment prevents shrinkage (partial peeling) which occurs at the interface between the edges of the adhesive and the substrate. In other words, as FIG. 21 shows, if the adhesive layer B is formed on the substrate P by spin coating, shrinkage tends to be generated at the inner and outer circumferences depending on the materials of the substrate P and the recording film R, as shown by the arrow marks, because of the shrinkage of the adhesive layer B. Such shrinkage causes an un-uniformity (film thickness un-uniformity) of the adhesive layer B and the generation of bubbles.

Figure 22:
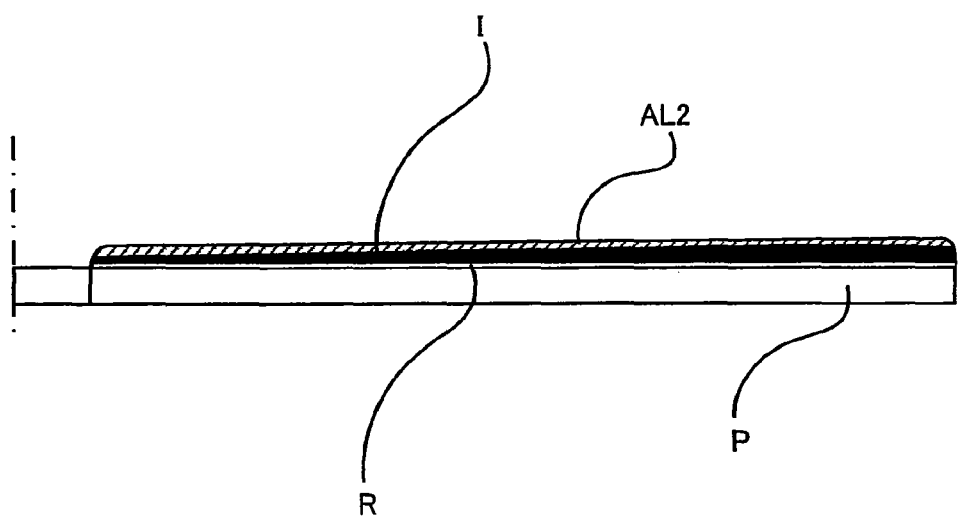
FIG. 22 is a diagram depicting the spread step of the second adhesive layer according to the fifth embodiment of the present invention.

Therefore in the present embodiment, the adhesive layer is formed, as FIG. 22 shows. In other words, after forming the first adhesive layer AL1 by spin coating, ultraviolet UV is irradiated on the entire surface or the inner and outer circumference sections. Then a part of the first adhesive layer AL1 is hardened and becomes the hardened section I. The first adhesive layer AL1 is hardened from the bottom (face contacting the substrate P). This is because in the portion closer to the surface exposed to air, oxygen exists which interrupts ultraviolet hardening.

On the first adhesive layer AL1 in which hardened section I is formed, the adhesive is coated again, and the second adhesive layer AL2 is formed by spin coating. Substrates on which a uniform adhesive layer B is formed by repeating the adhesive coating and hardening several times are laminated together, and ultraviolet is irradiated, so as to complete the disk.

According to the present embodiment, the adhesive, which is spread on the substrate P in advance, is hardened, so the substrate P and adhesive are not detached, and shrinkage can be prevented. And the adhesive can be spread again on the surface of the adhesive which is hardened only to a certain degree, so the affinity between the adhesives is high, and shrinkage does not occur later. Also the flow of adhesive to the outer circumference during spreading is suppressed, so uniform film thickness can be implemented easily.

[Sixth Embodiment]

The above embodiments relate to forming the adhesive layer (intermediate layer) for laminating a pair of substrates, but these embodiments may be used for making a cover layer (coating layer, protective layer) uniform on the surface of the substrate. In other words, in each of the above embodiments, a uniform cover layer can be formed by spreading and hardening two or more (n) layers of resin repeatedly on the substrate.

Now the embodiment for forming the cover layer by spreading resin several times will be described. In the present embodiment, heating by infrared irradiation is also performed to increase the accuracy of the uniformity of the cover layer.

[Step α]

Figure 23:
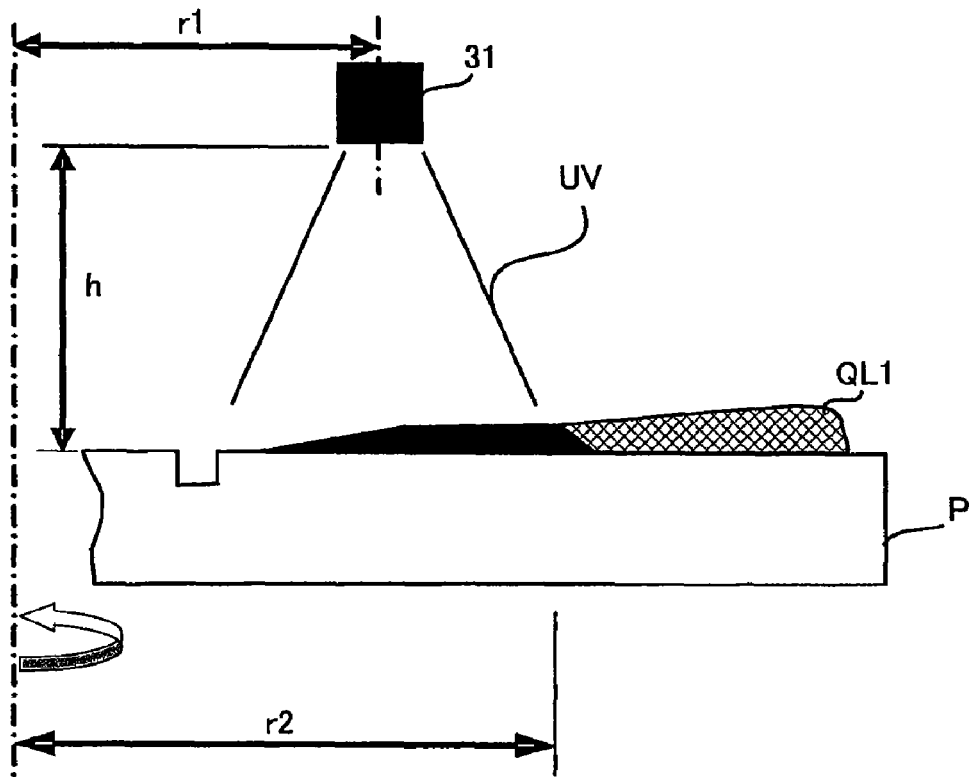
FIG. 23 is a diagram depicting the hardened section formation step according to the sixth embodiment of the present invention.

Initially the first step α will be described. As FIG. 23 shows, resin is dripped and coated on the substrate P rotating at low-speed, and the first resin layer QL1 is formed by high-speed spin coating. The resin to be used as a 430 cp viscosity, for example (this is the same herein below). Dripping and rotation conditions of the resin are 0.2 MPa×0.15 s and 400 rpm×1 rotation, for example. The rotation condition of spin coating is 10000 rpm×2 s, for example.

Then a part of the resin is hardened by irradiating ultraviolet UV on the inner circumference section (black portion in FIG. 23). Conditions are, for example, the rotation frequency of the substrate P is 300 rpm, the position of the ultraviolet irradiation section 31: radius r1 from the center of the substrate P is about 15 mm, height h=about 50 mm, the irradiation condition is 1500 mW/cm$^2$×1 s, and the outer circumference of the irradiation range is radius r2=about 23 mm.

Figure 24:
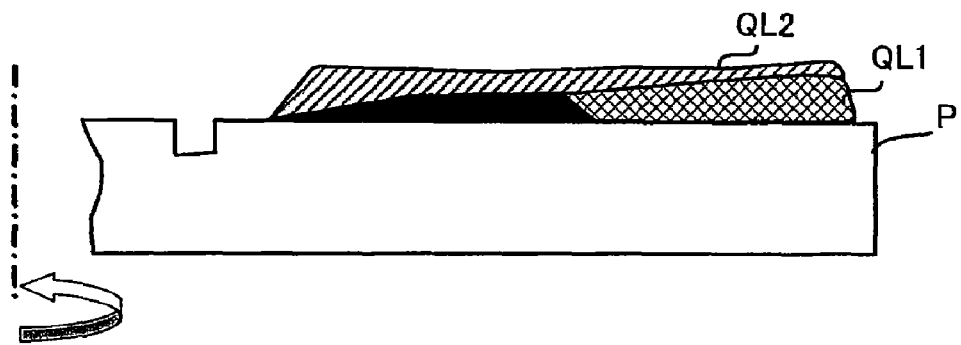
FIG. 24 is a diagram depicting the spread step of the second resin layer according to the embodiment in FIG. 23.
Figure 25:
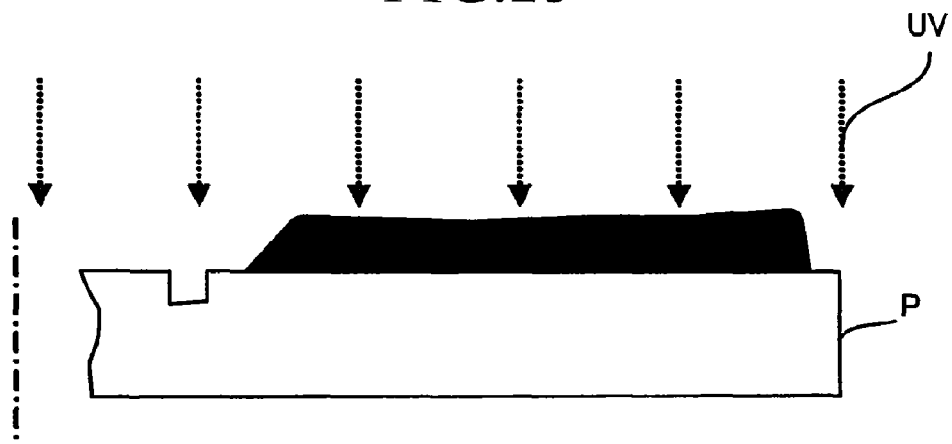
FIG. 25 is a diagram depicting the hardening step of the first and second resin layers according to the embodiment in FIG. 23.

Then as FIG. 24 shows, resin is dripped and coated on the substrate P which rotates at low-speed, and the second resin layer QL2 is formed by high-speed spin coating. Dripping of the resin and the rotation conditions are 0.2 MPa×0.5 s and 120 rpm×1 rotation, for example. The rotation condition of spin coating is 10000 rpm×1 s, for example. And as FIG. 25 shows, an N$_2$ purge is performed and the ultraviolet irradiation section 31 is moved to the position where the ultraviolet can be irradiated onto the entire surface (or the substrate P is moved to another location where irradiation on the entire surface is possible), and ultraviolet is irradiated to harden the entire surface. An irradiation condition is 50 mW/cm$^2$×5 s, for example. In this way, in step α, about 15 V μm of layer is formed, for example, by double coating.

[Step β]

Figure 26:
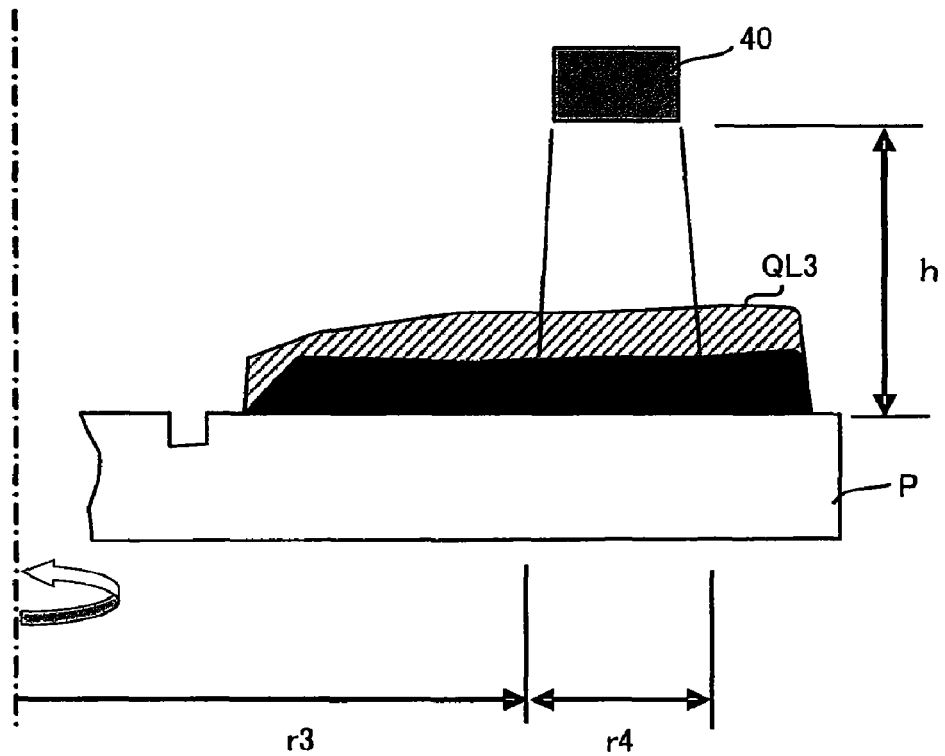
FIG. 26 is a diagram depicting the spread step of the third resin layer according to the embodiment in FIG. 23.

Now step β, which is repeatedly performed after step α, will be described. In other words, as FIG. 26 shows, resin is dripped and coated on the substrate P, on which the hardened resin layer is formed in step α, rotating at low-speed, and the third resin layer QL3 is formed by high-speed spin coating. At this time, the resin is spread while being heated by the heating section 40, which is an infrared irradiation device. The dripping and rotation conditions of resin are 0.2 MPA×0.5 s and 120 rpm×1 rotation, for example. The rotation condition of spin coating is 9000 rpm×1 s, for example. For the heating section 40, an infrared irradiation device of which specifications are 350 W and 900 to 3000 nm is used. The irradiation condition is that infrared is irradiated from height h=about 50 mm, in a range of radius r3 is about 40 mm to r4=about 12 mm from the center of the substrate P.

And just like FIG. 25, an N$_2$ purge is performed, and ultraviolet is irradiated onto the entire surface by the ultraviolet irradiation section 31 to harden the entire surface. The irradiation condition is 50 mW/cm$^2$×5 s, for example. By this, about 15 μm of layer is formed, for example. By repeating this step β six times, finally about 100 μm of cover layer, including about 15 μm of layer in the previous step α, is formed.

[Effect]

Figure 27:
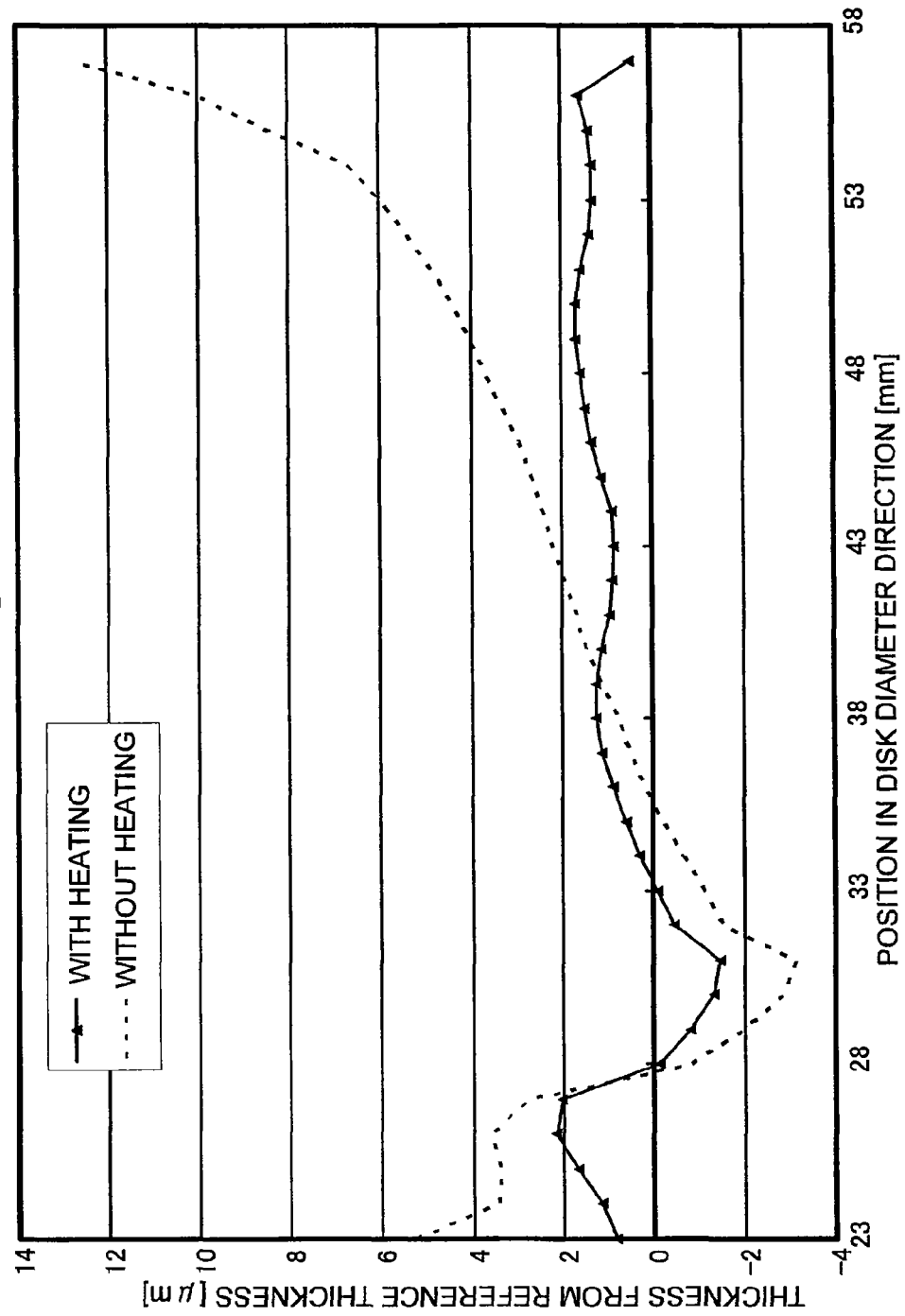
FIG. 27 is a graph depicting the experiment result of measuring uniformity of the resin layers of the embodiment in FIG. 23 and an unheated example.

According to the present embodiment, a uniform cover layer can be formed to a desired thickness by step α, and step β, which is performed repeatedly. Particularly step β includes a heating step, so the difference of thickness in the disk radius direction can be decreased remarkably compared with the case of not performing heating. This is clearly shown in FIG. 27, which shows comparison data of the cover layer when step α×once and step β×six times were performed, and the cover layer when step α×once and step β (no heating)×six times were performed under the above mentioned condition settings. In other words, in FIG. 27, the difference of thickness from the reference value for the cover layer with heating performed (indicated by a solid line connecting ▲) is confined to about ±2 μm in the position range 23 to 58 mm in the radius direction of the disk, but the difference for the cover layer without heating (indicated by a dotted line) is about −4 μm to +12 μm, presenting a major difference.

[Other Embodiments]

The present invention is not limited to the above embodiments. Particularly specific numeric values are relatively appropriate values to acquire a desired functional effect, but the present invention is not limited to these values.

Also in the fourth embodiment, it is optional which one of the substrates to be laminated is partially irradiated by ultraviolet and heated. For example, partial irradiation and heating may be performed on both substrates, or partial irradiation may be performed on both, and heating may be performed on one of them, or partial irradiation may be performed on one of them, and heating may be performed on both, or partial irradiation and heating may be performed only on one of them. Also each of the above embodiments may be combined. For example, the heating section in the fourth embodiment may be used for other embodiments.

Figure 28:
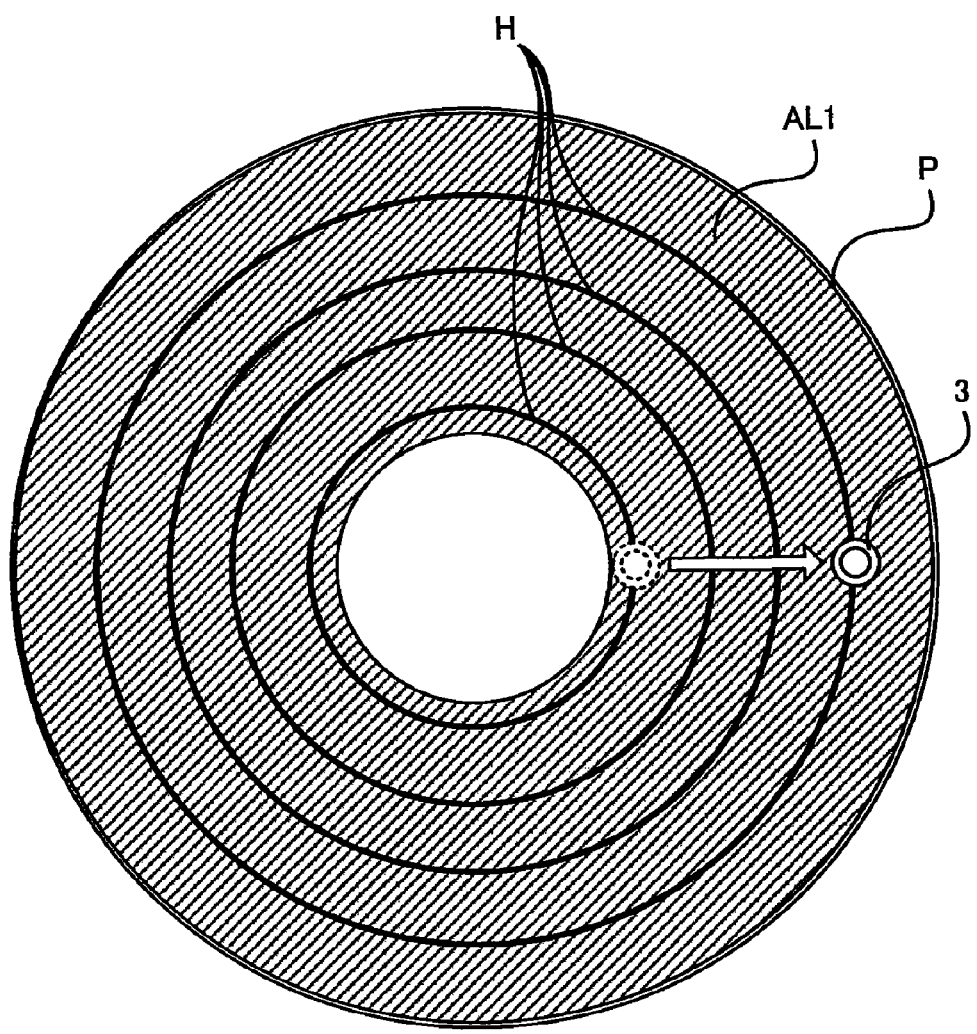
FIG. 28 is a plan view depicting the substrate on which step difference sections are formed concentrically.
Figure 29:
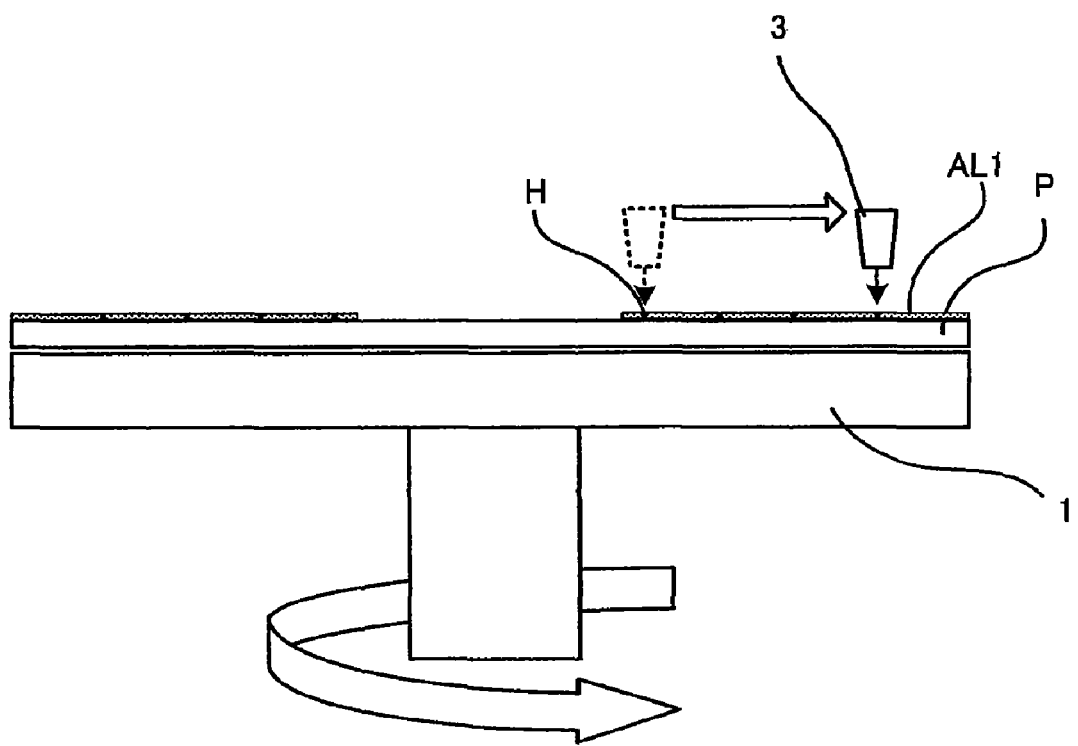
FIG. 29 is a diagram depicting a general configuration of the ultraviolet irradiation section for forming the step difference sections in FIG. 28.
Figure 30:
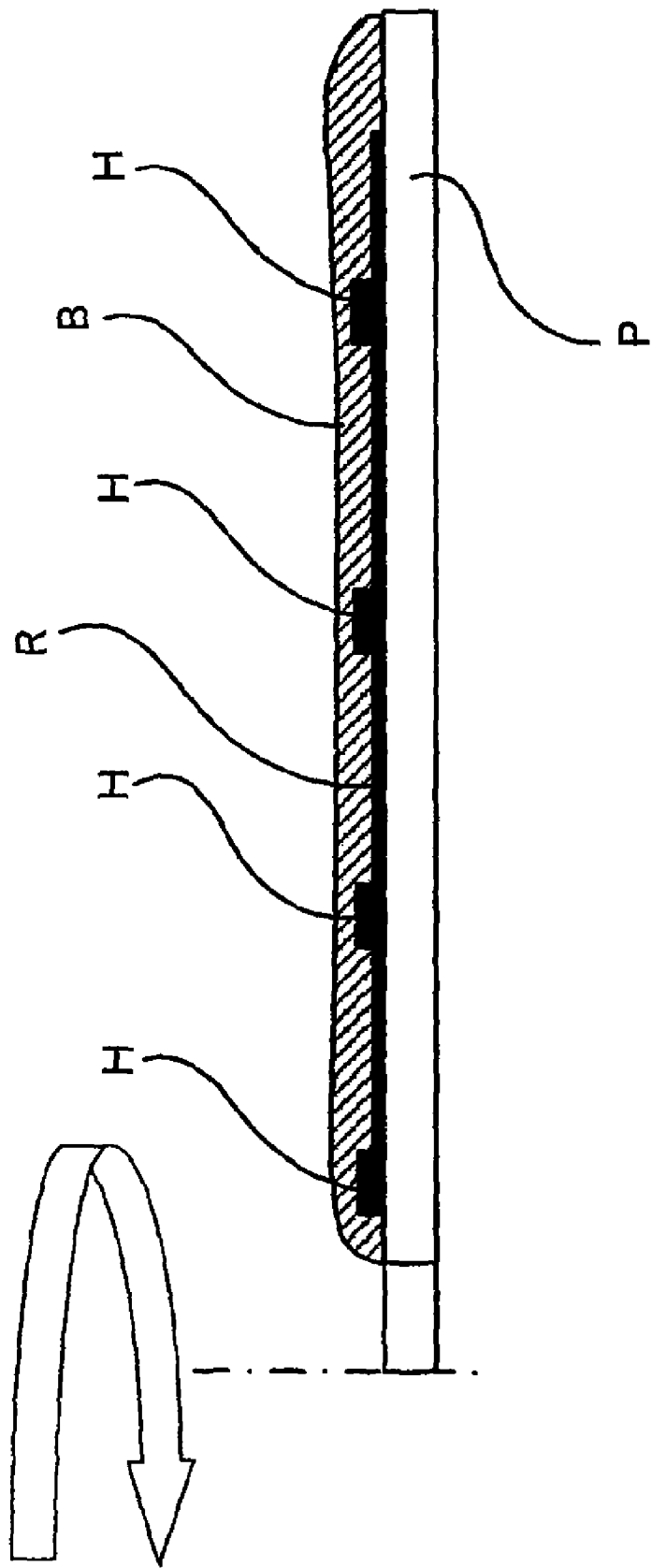
FIG. 30 is a longitudinal cross-sectional view depicting the step difference sections in FIG. 28.

Also a plurality of circular step difference sections H may be formed concentrically, as shown in FIG. 30, by irradiating ultraviolet at a predetermined timing while shifting the position of the ultraviolet irradiation section 3 in the disk diameter direction after the first adhesive layer AL1 is spread, as shown in FIG. 28 and FIG. 29. After this, adhesive A is coated on the inner circumference side and the substrate is rotated at high speed, so as to spread the second adhesive layer AL2, as mentioned above. In this case as well, a uniform adhesive layer B is formed.

Figure 31:
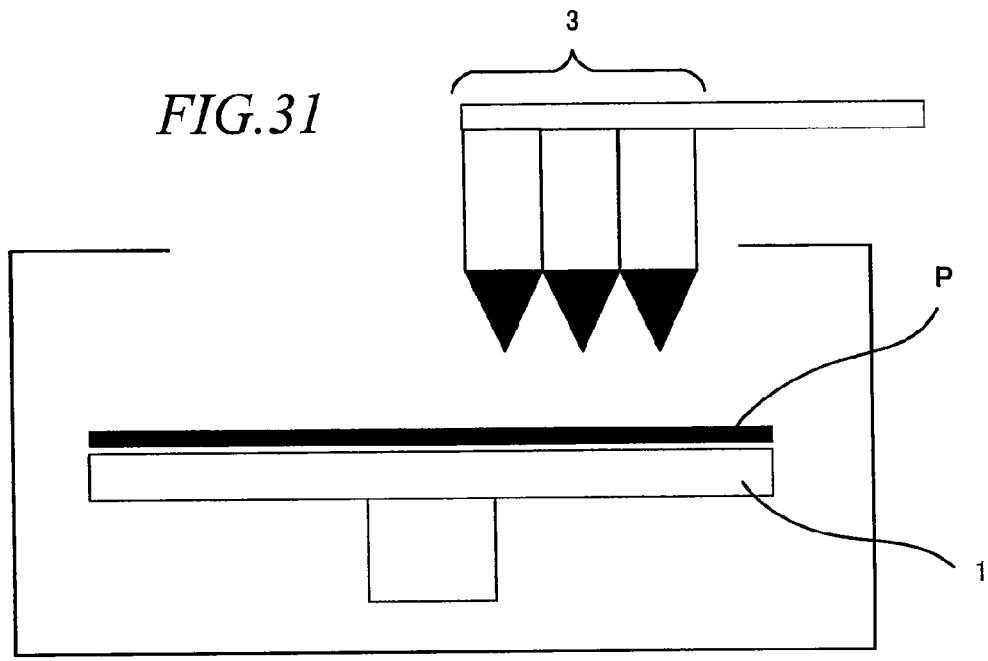
FIG. 31 is a diagram depicting a general configuration of a plurality of ultraviolet irradiation sections for forming a plurality of step difference sections.
Figure 32:
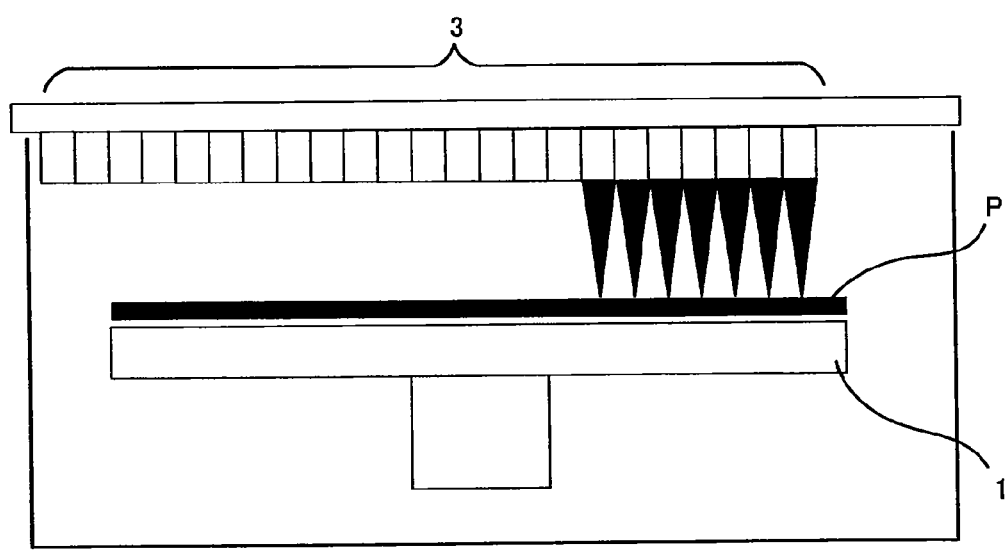
FIG. 32 is a diagram depicting a general configuration of a plurality of ultraviolet light emitting LEDs for forming a plurality of step difference sections.

Tact time can be decreased if many step difference sections H can be formed in a short time by installing many ultraviolet irradiation sections 3, which are comprised of a plurality of light sources in the diameter direction of the substrate P in advance, and irradiating ultraviolet by all or a part of them simultaneously, as shown in FIG. 31, just like the fourth embodiment. If many ultraviolet emission LEDs, shown in FIG. 32, are used as the plurality of light sources of the ultraviolet irradiation sections 3, then cost can be decreased by saving power consumption, and extending the life of the light sources. Ultraviolet may be irradiated on predetermined positions via a single or a plurality of slits and spot holes created by masking the light sources, or ultraviolet may be irradiated on predetermined positions at a predetermined time by opening/closing these slits or spot holes.

Figure 33:
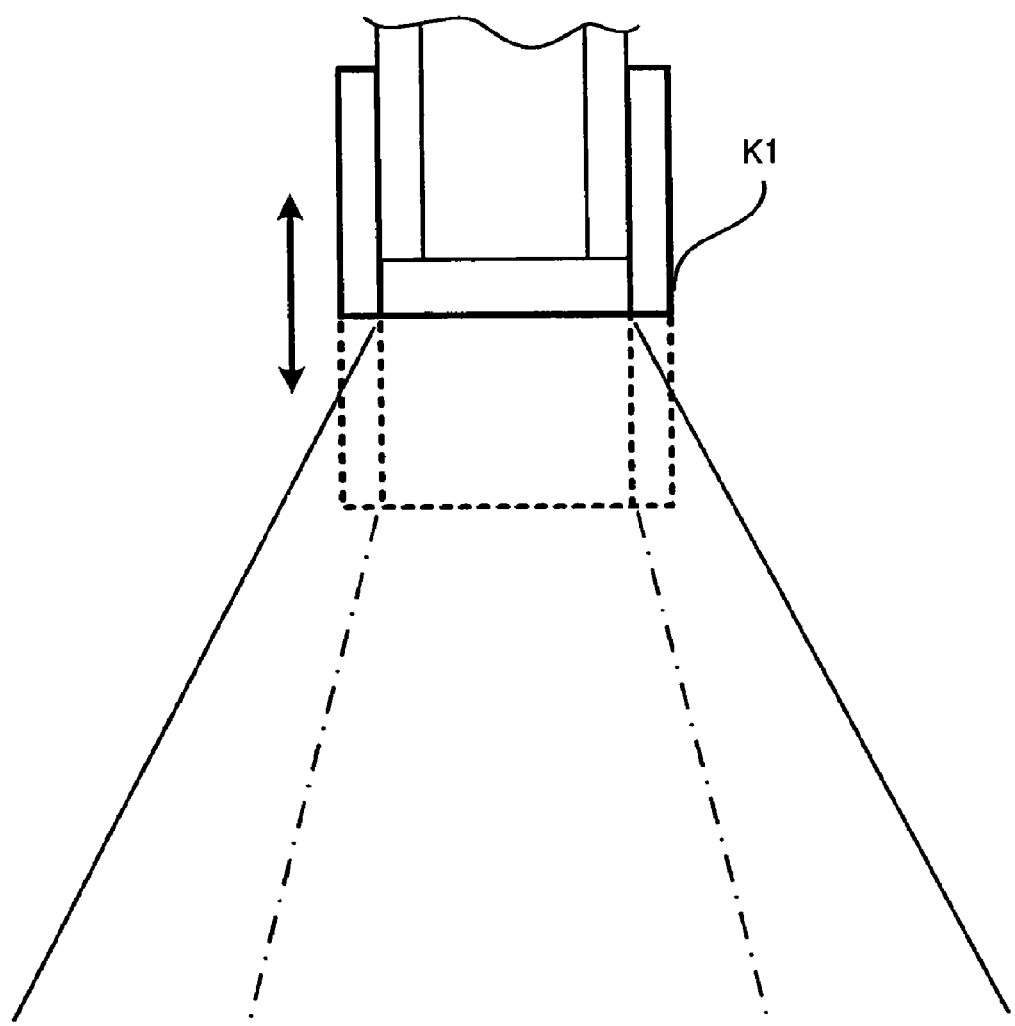
FIG. 33 is a diagram depicting a slide tube for changing ultraviolet or infrared irradiation range.
Figure 34:
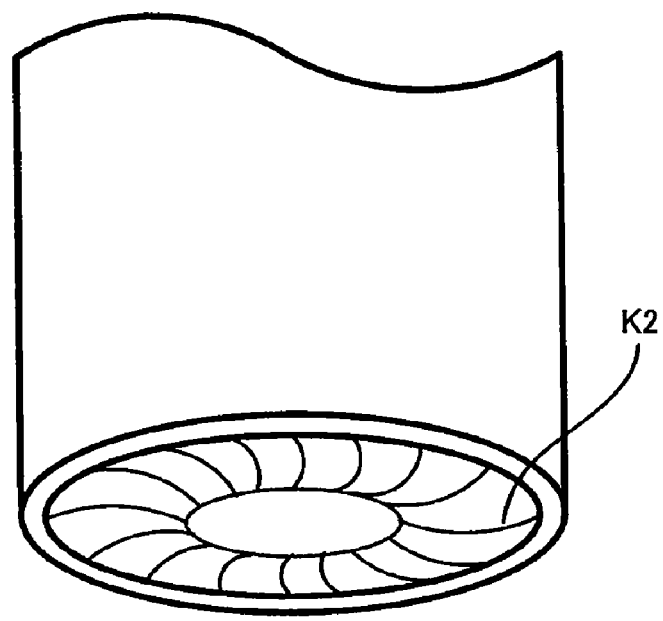
FIG. 34 is a diagram depicting the shutter for changing ultraviolet or infrared irradiation range.
Figure 35:
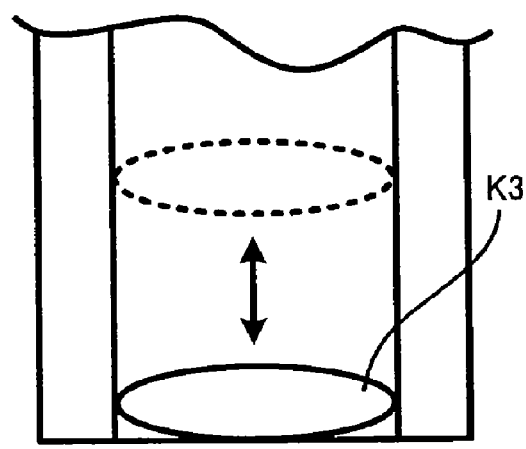
FIG. 35 is a diagram depicting the lens for changing ultraviolet or infrared irradiation range.

The irradiation range of ultraviolet or infrared may be a part or all of a target, but it is preferable that the irradiation device has a flexible structure to obtain an optimum effect according to various conditions. This makes various configuration examples possible. A simple method is using a movable light shielding plate. The slide tube K1 shown in FIG. 33, the shutter K2 shown in FIG. 34, and the movable lens K3 shown in FIG. 35, and various other methods are also possible. It is also possible to use a light shielding plate for determining the outer circumference in addition to the light shielding plate shown in the third embodiment.

Figure 36:
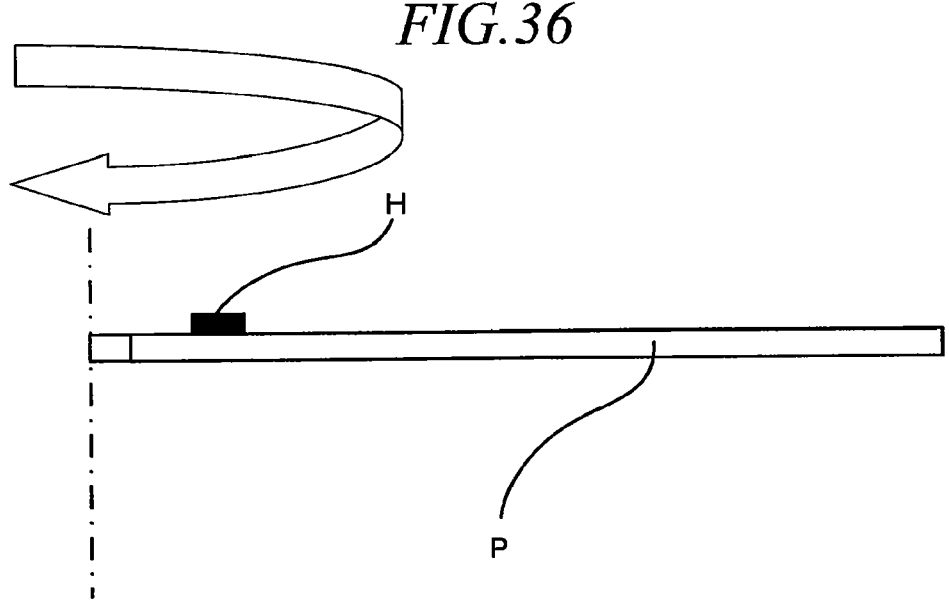
FIG. 36 is a longitudinal cross-sectional view depicting the substrate on which a step difference section was formed before spreading the adhesive.
Figure 37:
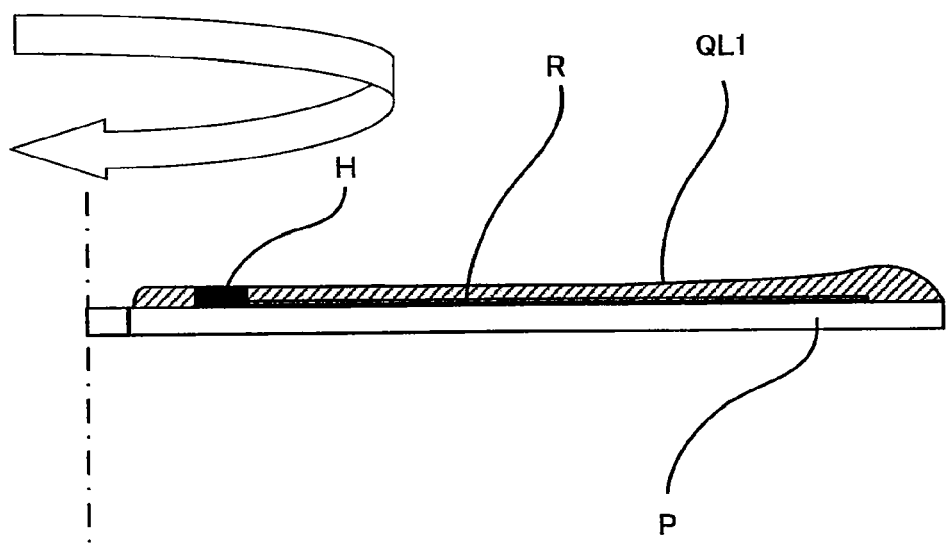
FIG. 37 is a longitudinal cross-sectional view depicting the state on which the adhesive is spread on the substrate in FIG. 36.

Also as FIG. 36 and FIG. 37 show, after forming the step difference section H by coating resin on the inner circumference section by low-speed rotation in advance and hardening it by ultraviolet irradiation, the resin coated in the inner circumference side may be spread by high-speed spinning. In this case as well, the excessive flow of resin from the inner circumference side to the outer circumference side is suppressed by the step difference section H, so uniform resin layer QL1 can be formed. On this resin layer QL1, the second resin layer may be formed, just like the above embodiments, so as to further improve uniformity.

The adjustment section (including the step difference section or hardened section) according to claim 1 is not limited to that formed by resin. A uniform resin layer can be formed by forming the step difference section H shown in FIG. 6 and other by material which does not spread easily, which is liquid, fluid, semi-fluid or solid, and spreading the resin coated in the inner circumference side thereof by high-speed rotation so as to suppress the excessive flow of the resin to the outer circumference side. On this resin layer, the second resin layer may be formed, just like the above embodiments, to further improve uniformity. Also the step difference may be formed by plate printing and ink jet printing, for example. The step difference section may also be created by forming bumps in a part of the inner circumference side using laser markers, for example, or an already formed step difference section may be processed and modified.

The shape, height, width, position and count of the adjustment section (including the step difference section or hardened section) can be freely changed. For example, the corner of the cross-section may be rounded, or the top face may be inclined. An intermittent, not continuous, circular shape may be used. If the adjustment section is formed by hardening the resin, the adjustment section may be scattered on the surface of the recording film.

Products may be mass produced efficiently by creating a plurality of each component of the resin layer formation device, and performing processing simultaneously in parallel. For example, two independent turntables, which is a rotation section for rotating a substrate mounted thereon, may be provided so that the first resin layer is formed on one turntable by coating resin and spreading the resin by high-speed spinning, and the step difference section is formed by the ultraviolet irradiation section, and then the substrate is moved to the other turntable, and the second resin layer is formed by coating resin and spreading the resin by high-speed spinning. In other words, the first resin layer, the step difference section and the second resin layer may all be formed on a single rotation section, just like the cases of the above embodiments, or the first resin layer and step difference section may be formed on one of the two rotation sections, and the second resin layer may be formed on the other rotation section.

The first resin layer may be formed on one of the two rotation sections, and the step difference section and the second resin layer may be formed on the other rotation section. Three rotation sections may be formed so that the first resin layer, the step difference section and the second resin layer are formed on the rotation sections respectively. The ultraviolet irradiation section may be formed for each of the plurality of rotation sections, or may be formed so as to move between the plurality of rotation sections, so that the above mentioned different modes can be switched and implemented in a same device.

The size, shape, material and count of recording film of the disk manufactured according to the present invention are arbitrary, and are not limited to the conventional standards of CD and DVD, but can be applied to all kinds of standards to be adapted in the future. The present invention can be applied not only to disks for recording information, but also to various substrates which are laminated together using resin. In other words, the material and shape of the substrate, and the type of resin to be the adhesive are not limited to those used in the above embodiments either. For example, the possible materials of the substrate are polycarbonate, acrylic or epoxy resin, but the present invention is not limited to these.

As mentioned above, the present invention may be applied not only to an adhesive layer, but also to a cover layer. Typical examples are an adhesive layer of a laminated-substrates type disk, and an intermediate layer where the substrate, on which surface a stamp section is formed by resin, is laminated. Also the present invention is suitable for an adhesive layer between a film and the substrate on the surface of a Blu-Ray disk (BD), or a cover layer coating the surface of BD instead of the film. With BD in particular, the NA of the objective lens is large, and a high thickness accuracy is required for the cover layer (about 100 μm) on the surface, so the present invention is appropriate.

For the resin used for laminating and coating, various material which is currently available or will be available in the future can be used only if it can be spread by rotation. Resin, which is hardened by externally irradiating electromagnetic radiations in a wide sense, such as radiation hardening resin, or by applying a temperature change, such as thermo-hardening resin, can also be used.

The invention claimed is:

1. A resin layer formation device, comprising:
    a coating section for coating an ultraviolet-hardening type resin on a substrate;
    a first rotation section for forming a first resin layer on the surface of the substrate by rotating said substrate coated with the resin by said coating section;
    an ultraviolet irradiation section for forming a hardened section on the substrate by hardening a part of the first resin layer by irradiating ultraviolet light on the first resin layer;
    a second rotation section for forming a second resin layer by rotating said substrate coated with the resin applied by said coating section, said ultraviolet irradiation section is configured such that the irradiation intensity is stronger at a center of the irradiated ultraviolet light and decreases from the center as an outer circumference is approached; and
    a heater section for heating the outer circumference of the substrate.

2. The resin layer formation device according to claim 1, characterized in that a plurality of said ultraviolet irradiation sections are constructed.

3. The resin layer formation device according to claim 1, characterized in that said ultraviolet irradiation section is movably constructed.

4. The resin layer formation device according to claim 1, characterized in that said ultraviolet irradiation section is constructed so that the irradiation range is variable.

5. The resin layer formation device according to claim 1, characterized in that a plurality of said ultraviolet irradiation sections are constructed to be positioned across the substrate.

6. The resin layer formation device according to claim 1 further including a computer controlled control device operatively connected to the coating section, first rotation section, ultraviolet irradiation section and second rotation section for automatically controlling and coordinating the coating of ultraviolet-hardening type resin, the formation of the hardened section on a part of the first resin layer with ultraviolet irradiation intensity stronger adjacent the center of the disk substrate and decreases radially outward therefrom and the formation of the second resin layer.

7. The resin layer formation device according to claim 1, characterized that a shielding tube is movably installed around the irradiated ultraviolet light to adjust the area of irradiation.

8. The resin layer formation device according to claim 1, characterized in that a light shielding plate is mounted so that the ultraviolet irradiated on a part of said first resin layer by said ultraviolet irradiation section is shielded.

9. The resin layer formation device according to claim 1, characterized in that a heating section is constructed so that the resin is heated when said second resin layer is formed while rotating said substrate by said rotation section.

10. The resin layer formation device according to claim 1, characterized in that said heating section is constructed so that the heating range is variable.

11. The resin layer formation device according to claim 1, characterized in that said first rotation section and said second rotation section are constructed by a common device.

* * * * *